United States Patent [19]

Iwata

[11] Patent Number: 5,594,679

[45] Date of Patent: Jan. 14, 1997

[54] ADAPTIVE VIDEO SIGNAL PROCESSING APPARATUS

[75] Inventor: Eiji Iwata, Tokyo, Japan

[73] Assignee: Sony Corporation, Tokyo, Japan

[21] Appl. No.: 343,537

[22] PCT Filed: Mar. 30, 1994

[86] PCT No.: PCT/JP94/00525

§ 371 Date: Feb. 3, 1995

§ 102(e) Date: Feb. 3, 1995

[87] PCT Pub. No.: WO94/23384

PCT Pub. Date: Oct. 13, 1994

[30] Foreign Application Priority Data

Mar. 31, 1993 [JP] Japan .................................. 5-074768

[51] Int. Cl.$^6$ ........................................................ G06F 7/38
[52] U.S. Cl. ........................ 364/736; 395/800; 382/250; 382/251
[58] Field of Search .................................. 364/736, 748, 364/754; 395/375, 800; 382/250, 251, 261

[56] References Cited

U.S. PATENT DOCUMENTS

| | | | |
|---|---|---|---|
| 5,179,531 | 1/1993 | Yamaki | 364/736 |
| 5,260,897 | 11/1993 | Toriumi et al. | 364/736 |
| 5,299,319 | 3/1994 | Vassiliadis et al. | 364/736 |

OTHER PUBLICATIONS

Yamauchi et al. "Architecture and Implementation of a Highly Parallel Single-Chip Video DSP", IEEE Transactions on Circuits and Systems for Video Technology, vol. 2, No. 2, Jun. 1992, pp. 207–220.

Primary Examiner—Roy N. Envall, Jr.
Assistant Examiner—Emmanuel L. Moise
Attorney, Agent, or Firm—Ronald P. Kananen

[57] ABSTRACT

A processing apparatus which adaptively performs image compensation and encoding/expansion and decoding processing such as discrete cosine transformation (DCT)/inverse discrete cosine transformation (IDCT), inner product computation, image data addition, and image data differential processing, etc. for blocks of image data of a size of m×n, which is provided with (a) plurality of parallel processing units 1 to 4 each of which performs addition, subtraction, various types of logical computations, comparison of magnitude, computation of absolute values of differences, and butterfly addition-subtraction processing, performs multiplication, and performs accumulation; (b) mutually connected pipeline memories 5 to 7 which are disposed so as to connect adjoining processing units among these processing units; and (c) data selectors 41 to 44 which selectively apply input data to the processing units 1 to 4, wherein adjoining processing units are coupled via the mutually connected pipeline memories and wherein an internal pipeline memory in the aforesaid processing unit is selected to constitute a predetermined data flow path, thereby to perform DCT or other desired video signal processing.

24 Claims, 19 Drawing Sheets

CONNECTION STATE OF PROCESSING UNIT

ALU : ARITHMETIC AND LOGIC UNIT
MUL : MULTIPLIER
CM : COEFFICIENT MEMORY
ACC : ACCUMULATOR

EXAMPLE OF COMPUTATION PIPELINE

TIMING CHART OF COMPUTATION PIPLINE PROCESSING

CONFIGURATION OF PROCESSING UNITS 0.2

SEL : DATA SELECTOR
EALU : EXTENDED ALU
MUL : MULTIPLIER
ACC & SHIFT : ACCUMULATOR EQUIPPED WITH SHIFT FUNCTION

CONFIGURATION OF PROCESSING UNITS 1, 3

SEL : DATA SELECTOR
EALU : EXTENDED ALU
MUL : MULTIPLIER
ACC & SHIFT : ACCUMULATOR EQUIPPED WITH SHIFT FUNCTION

VIEW OF CONCEPT OF PROCESSING PIPELINE CONFIGURATION OF 8×8 DCT

P/S : PARALLEL-SERIAL CONVERTER

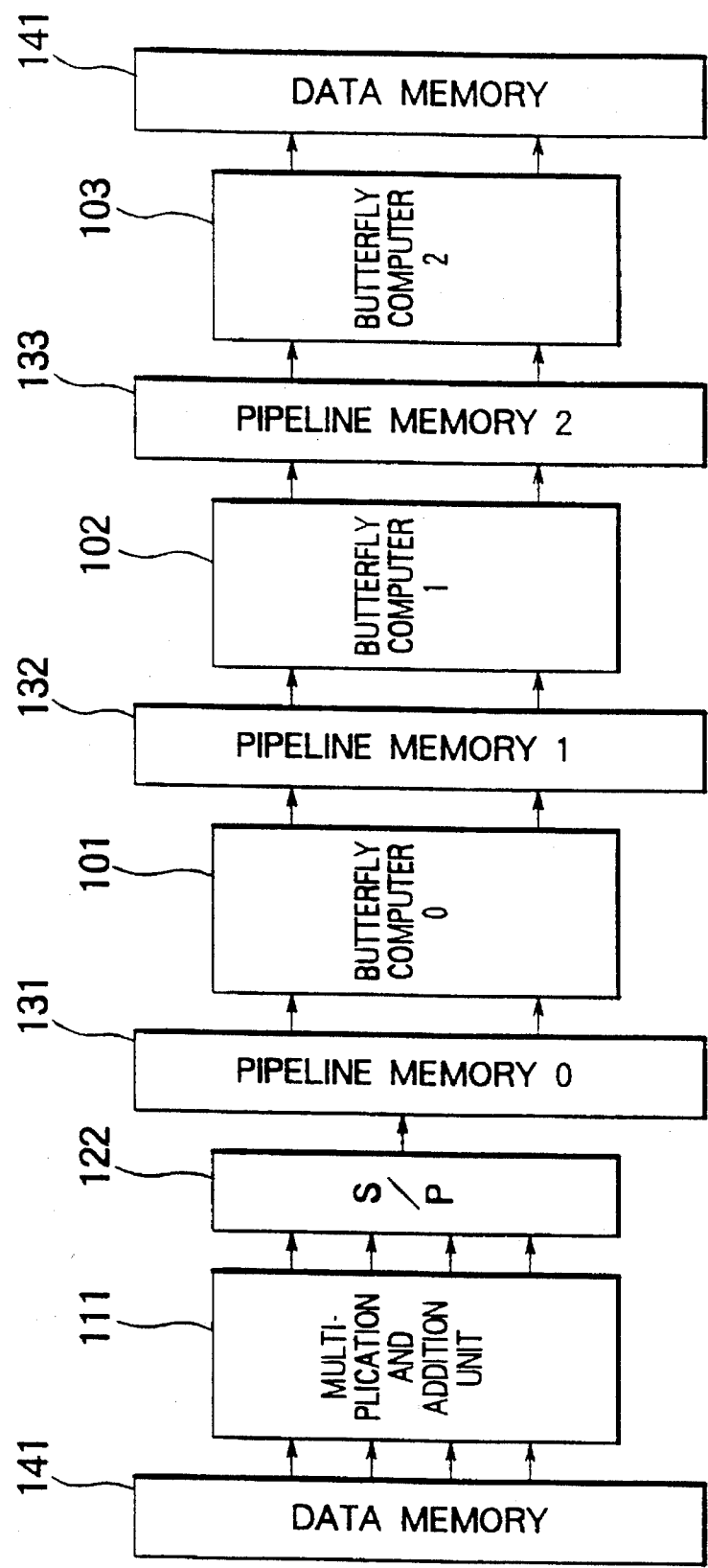

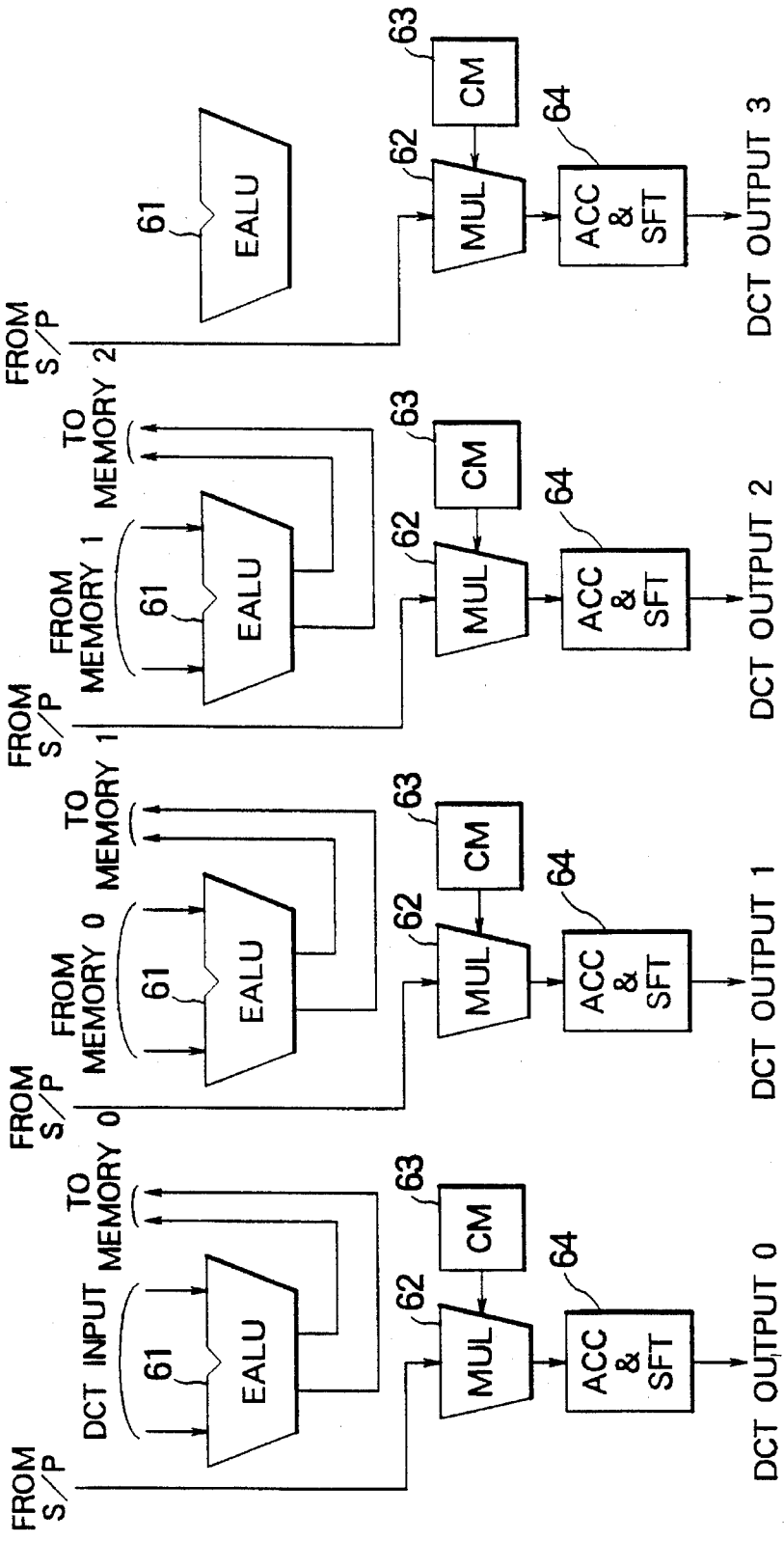

P/S: PARALLEL-SERIAL CONVERTER
EALU: EXTENDED ALU
MUL: MULTIPLIER
CM: COEFFICIENT MEMORY
ACC&SFT: ACCUMULATOR AND SHIFTER

CONFIGURATION OF COMPUTATION PIPELINE AT TIME OF IDCT PROCESSING

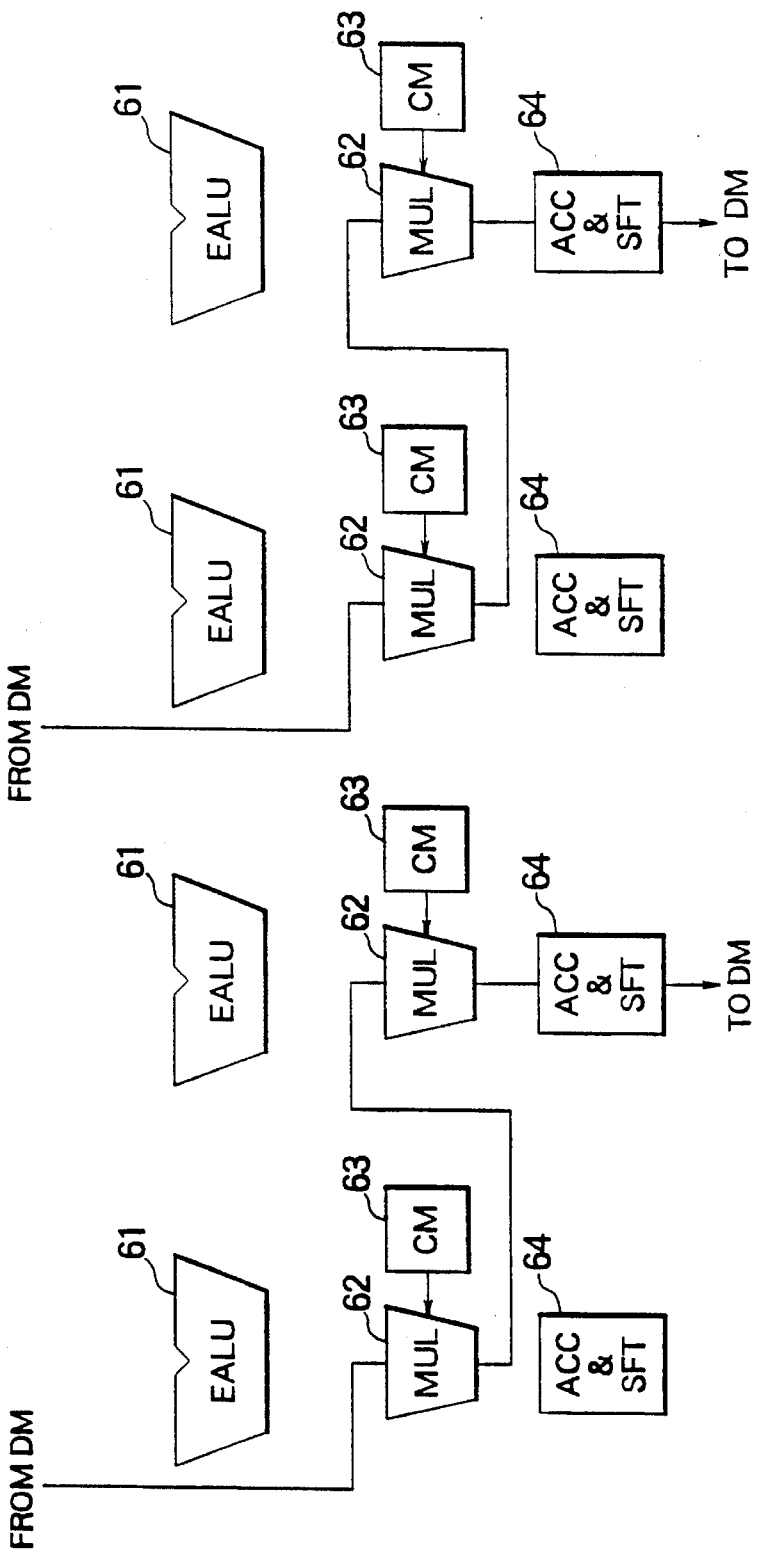

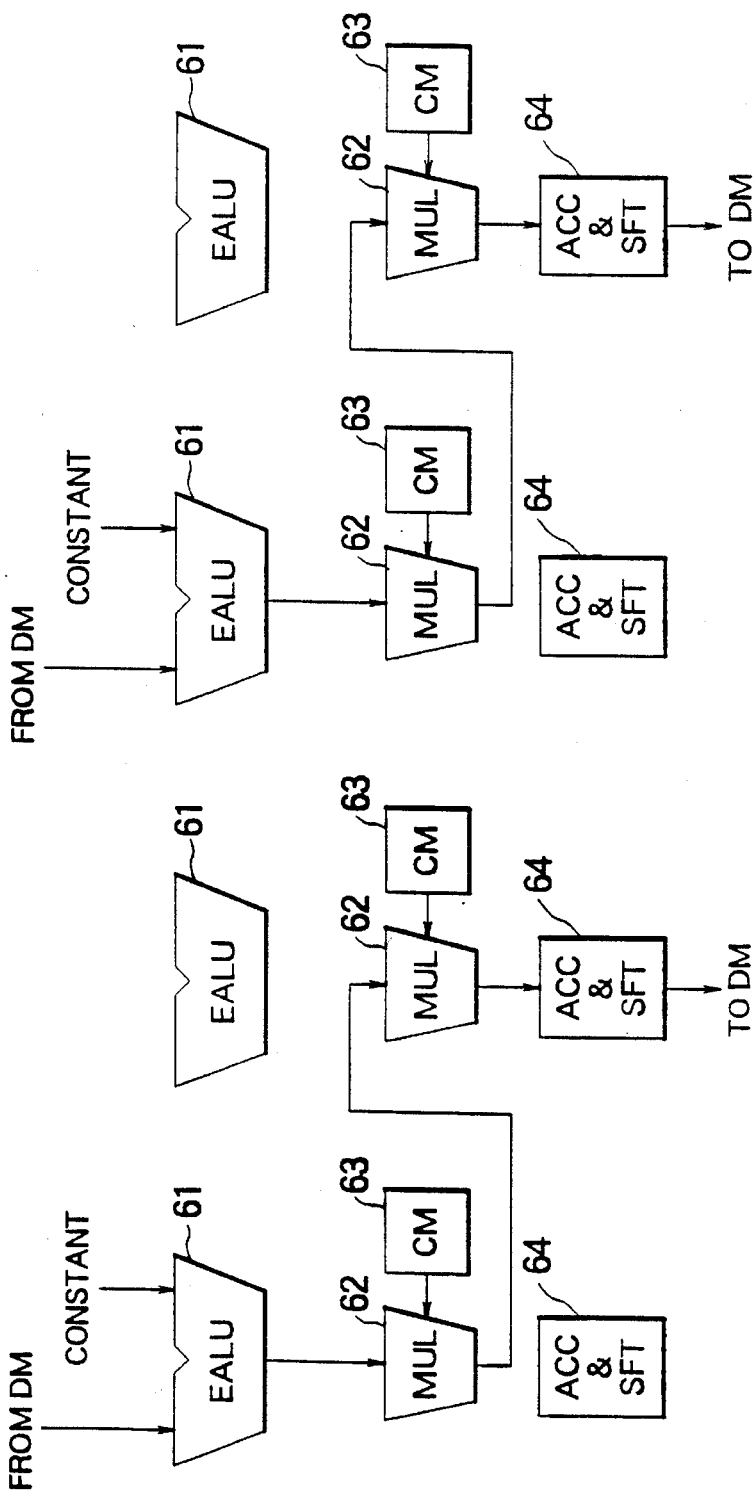

DM : DATA MEMORY
EALU : EXTENDED ALU
MUL : MULTIPLIER
CM : COEFFICIENT MEMORY
ACC&SFT : ACCUMULATOR AND SHIFTER

CONFIGURATION OF COMPUTATION PIPELINE AT TIME OF MOTION VECTOR DETECTION PROCESSING

FIG. 16

VIRTUAL PIXEL PRODUCTION RULE OF MOTION COMPENSATION x ○   b ○   z ○ e ○   a ○   c ○      ○ : PIXEL
                     ○ : VIRTUAL PIXEL y ○   d ○   w ○

$$a = \frac{1}{4}(x+y+z+w)$$

$$b = \frac{1}{2}(x+z)$$

$$c = \frac{1}{2}(z+w)$$

$$d = \frac{1}{2}(y+w)$$

$$e = \frac{1}{2}(x+y)$$

DM : DATA MEMORY
EALU : EXTENDED ALU
MUL : MULTIPLIER
CM : COEFFICIENT MEMORY
ACC & SFT : ACCUMULATOR AND SHIFTER

CONFIGURATION OF COMPUTATION PIPELINE AT TIME OF
VIRTUAL PIXEL PRODUCTION PROCESSING IN MOTION COMPENSATION

DM : DATA MEMORY
EALU : EXTENDED ALU
MUL : MULTIPLIER
CM : COEFFICIENT MEMORY
ACC&SFT : ACCUMULATOR AND SHIFTER

CONFIGURATION OF COMPUTATION PIPELINE AT TIME OF
PREDICTIVE PIXEL PRODUCTION PROCESSING IN MOTION COMPENSATION

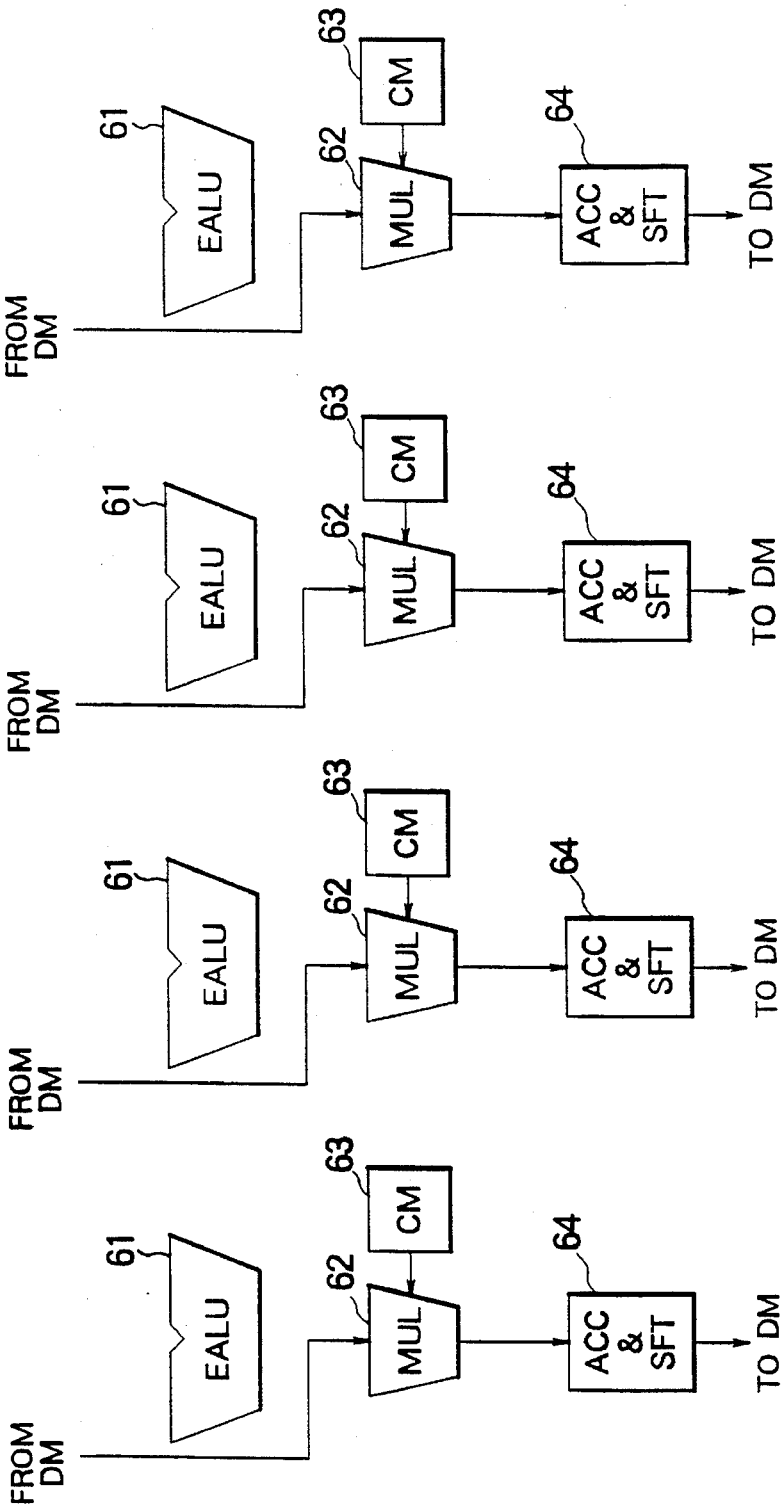

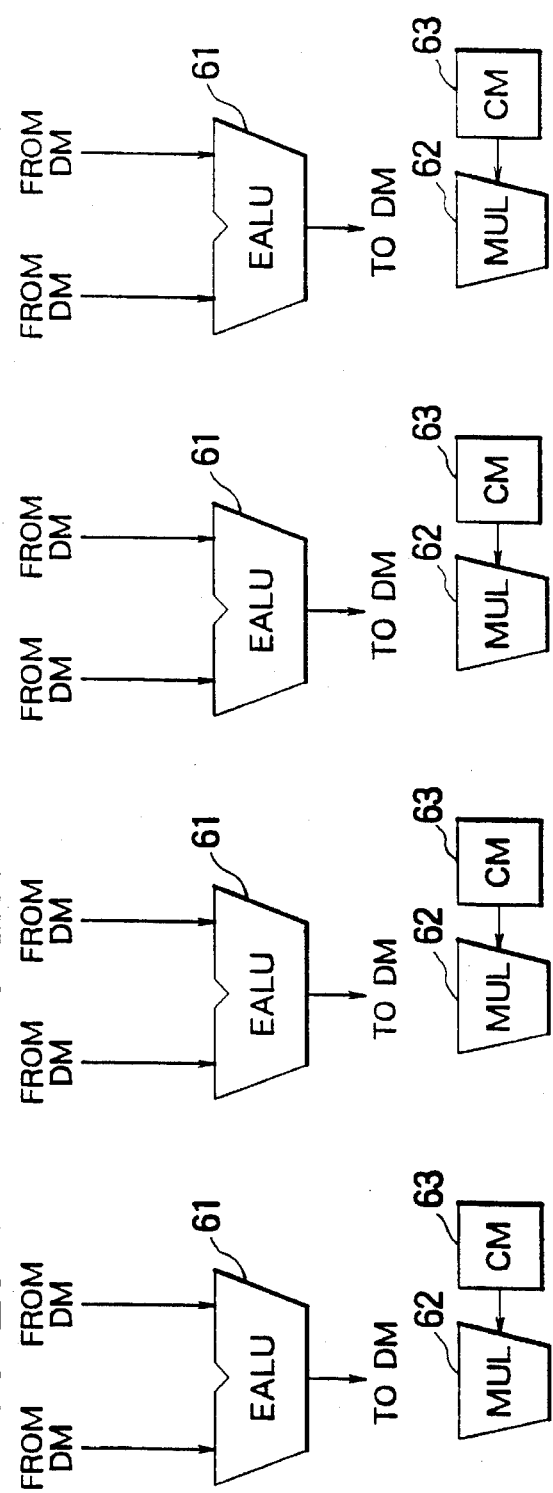
CONFIGURATION OF COMPUTATION PIPELINE AT TIME OF IMAGE ADDITION OR SUBTRACTION PROCESSING
DM : DATA MEMORY
EALU : EXTENDED ALU
MUL : MULTIPLIER
CM : COEFFICIENT MEMORY
ACC & SFT : ACCUMULATOR AND SHIFTER 5,594,679

ADAPTIVE VIDEO SIGNAL PROCESSING APPARATUS

This application is a 371 of PCT/JP94/00525 Mar. 30, 1994.

TECHNICAL FIELD

The present invention relates to a central processing unit (processing apparatus) in a computer system used for example for calculation of numerical values, image processing, graphic processing, etc., and particularly relates to an adaptive video signal processing apparatus, for example, a digital signal processor (DSP), suitable for video signal processing such as image compression and encoding (CODEC).

BACKGROUND ART

In recent years, a large number of digital signal processors (DSP) for image codex have been proposed based on image compression and encoding/expansion and decoding standards such as the CCITT H. 261 recommendation, MPEG, or the like.

Among these DSP's, the present invention relates to a DSP of a "single instruction stream·multiple data stream (SIMD)" control system which has a plurality of processing units each comprising an arithmetic and logic unit, multiplier, accumulator, etc., wherein these processing units perform parallel processing on a plurality of data by a single instruction flow, as disclosed in Yamauchi et al, "Architecture and Implementation of a Highly Parallel Single-Chip Video DSP", IEEE TRANSACTIONS ON CIRCUITS AND SYSTEMS FOR VIDEO TECHNOLOGY, VOL. 2, NO. 2, JUNE 1992, pp. 207–220.

The configuration disclosed in this reference is shown in FIG. 1. The processing unit of this DSP can connect processors in a pipeline and also performs pipeline processing of computations.

A simple explanation will be made first of a principle of the computation pipeline.

FIG. 2 shows an example of the configuration of the computation pipeline. This computation pipeline is one in which two inputs X and Y are added at an arithmetic and logic unit (ALU) A1, the result of addition and the coefficient from a coefficient memory A3 are multiplied at a multiplier A2, and the result of that multiplication is then accumulated at an accumulator A3. Continuous performance of a chain of such computations with respect to a plurality of data is called "computation pipeline processing".

FIG. 3 is a graph showing a timing chart of the processing in the computation pipeline of FIG. 2. For simplification, it is assumed that the processors A1, A2, and A4 of the computation pipeline complete the computation in one clock cycle.

The "unit of processing" in FIG. 3 means a set (X, Y) of the data input to a two-input terminal.

As shown in FIG. 3, when looking for example at the i-th unit of processing, in the (k−1)-th clock cycle, the ALU (A1) performs addition processing;

in the k-th clock cycle, the multiplier A2 performs multiplication processing;

in the (k+1)-th clock cycle, the accumulator A4 performs accumulation processing. Also, when looking at the k-th clock cycle, the (i−1)-th unit of processing after the addition processing and the multiplication processing is accumulated at the accumulator A4, the i-th unit of processing after the addition is multiplied at the multiplier A2, and the (i+1)-th unit of processing is added at the adder A1.

By repeatedly performing such an operation with respect to a plurality of units of processing, the computation pipeline processing can be realized.

Next, an explanation will be made of a prior art.

Here, a DSP of the "single instruction stream·multiple data stream (SIMD)" control system which has been proposed in the above-mentioned reference, in which four sets of processing units perform parallel processing on a plurality of data by a single instruction flow will be considered.

As a prerequisite, it is assumed that each processing unit is comprised of three types of processors, that is, an arithmetic and logic unit (ALU) performing the addition, subtraction, and the logical computation, a multiplier, and an accumulator. Also, for ease of the explanation, it is assumed that each processor completes the computation in one clock cycle. Accordingly, this DSP can execute 12 computations (for example, four addition, four multiplication, and four accumulation operations) at the maximum in one clock cycle. Further, it is assumed that this DSP has a data memory for supplying the data to the processors or storing the data from the processors inside a chip or outside the chip.

First, the configuration for realizing the computation pipeline having the highest degree of freedom will be explained based on the above-described prerequisites.

As shown in FIGS. 4A to 4D, the computation pipeline having the highest degree of freedom can be realized by regarding the data memory as a pipeline register and performing the computation pipeline processing by software (called software pipelining). At this time, the processing units are connected only via the data memory. Note that, FIGS. 4A to 4D show the operation modes of four parallel processing units. Accordingly, the data memory must be able to supply arbitrary data to the inputs of all processors at every clock cycle and simultaneously store the data of outputs from all processors at arbitrary addresses.

As the number of ports of the data memory, as seen from the illustration of FIGS. 4A to 4D, 16 ports are necessary for the input to the processors and 12 ports are necessary for the output from the processors. Accordingly, a multiport memory of a total of 28 ports is necessary. This number of ports is not realistic when considered in light of the current semiconductor circuit technology and its realization is actually difficult.

Therefore, a procedure for dividing the data memory into banks and reducing the number of ports per bank can be considered. However, even if a data memory is divided into four banks, for example, in the above-described example, a multiport memory of seven ports per bank would be still be necessary.

Accordingly, it is possible to adopt an approach of restricting the degree of freedom of the computation pipeline to a certain extent in accordance with the application program and thus reducing the number of ports of the data memory. For example, as proposed in the above-mentioned reference, four computation pipelines comprising an ALU, multiplier, and accumulator are provided, and only the inputs and outputs of the computation pipelines are connected to the data memory. The number of ports required for the data memory in this case becomes eight ports for the input to the computation pipeline and four ports for the output from the computation pipeline.

However, in the configuration of the computation pipeline of the conventional DSP mentioned above, there is a restriction in the degree of freedom of the computation pipeline. For example, for processing for logical computation after multiplication, this pipeline computation cannot be carried out. In this case, first the pipeline processing of multiplication is carried out with respect to all data using the multiplier and then the pipeline processing of the logical computation is carried out with respect to all data after the multiplication using the ALU. Accordingly, the ALU is not used at the time of multiplication, and the multiplier is not used at the time of the logical computation, and therefore the efficiency of use of the multiplier is lowered and a reduction of performance is induced. Also, since the computation pipeline processing is carried out divided into two steps, it becomes necessary to perform the initialization two times at the time of starting the computation pipeline.

Further, in the above-mentioned conventional DSP, it is necessary to store an intermediate result at the point of time of completion of the first computation pipeline processing, and therefore a larger capacity of the data memory is required.

In the element processing of image CODEC, other than the processing for the logical computation after multiplication as in the above-described example, processing for continuously performing multiplication, processing for adding the results of multiplication to each other, and so on become necessary. A problem similar the above-mentioned problem occurs in each of these processing operation.

Also, with the computation pipeline configuration of the above-mentioned conventional DSP, the configuration of the computation pipeline of the butterfly computation (addition and subtraction) and the multiplication and addition in a high speed computation algorithm as proposed in Japanese Patent Application No. 4-338183 "two-dimensional 8×8 discrete cosine transformation circuit and two-dimensional 8×8 inverse discrete cosine transformation circuit" by the present assignee cannot be realized.

In this preceding patent application, when the two-dimensional 8×8 discrete cosine transformation or the two-dimensional 8×8 inverse discrete cosine transformation are carried out, matrix decomposition is supplied and computation processing is carried out. A detailed description will be given later referring to FIG. 9 and FIG. 10.

The reason why the computation pipeline cannot be constituted as described above is that the multiplication and addition cannot be carried out in parallel when performing the butterfly computation (two processing units are used in the conventional example) due to the limitation of the number of ports of the data memory. Accordingly, the butterfly computation and the multiplication and addition are sequentially executed, and therefore the performance is considerably lowered in comparison with an ideal computation pipeline configuration as proposed in the above-described patent application.

DISCLOSURE OF INVENTION

An object of the present invention is to provide an adaptive video signal processing apparatus which can perform computation for performing logical computations after performing multiplication, computation for continuously performing multiplication, or various other computations for adding the multiplication results to each other in the element processing of image CODEC by one apparatus.

Another object of the present invention is to realize the adaptive video signal processing apparatus of the present invention by one pipeline processing using one computation pipeline based on the "single instruction stream-multiple data stream (SIMD)" control system. That is, another object of the present invention is to provide an adaptive video signal processing apparatus which can execute computations using different processors in parallel and therefore does not lower the efficiency of use of the processors.

Still another object of the invention is to provide an adaptive video signal processing apparatus wherein a single initialization is sufficient at the time of the startup of the computation pipeline.

A still further object of the present invention is to provide an adaptive video signal processing apparatus which does not have to store the intermediate result, and therefore does not increase the required data memory capacity.

To solve the above problems and achieve the above objects, the basic concept of the present invention is to provide a digital signal processor (DSP) performing video signal processing, that is, an adaptive video signal processing apparatus which is provided with a plurality of processing units each comprising an arithmetic and logic unit (ALU), a multiplier, and an accumulator, wherein the configuration of connection of the processors in these processing units and the configuration of connection among the processing units are appropriately switched, thereby providing a variable-configuration computation pipeline realizing a computation pipeline suitable for each of the element processing of:

(1) discrete cosine transformation/inverse discrete cosine transformation (DCT/IDCT);

(2) quantization/inverse quantization;

(3) moving picture detection;

(4) motion compensation (production of virtual pixel, production of predictive pixel);

(5) filter (computation of inner product); and (6) addition of images, subtraction of images; and so on in image CODEC processing.

Accordingly, according to the present invention, there is provided an adaptive video signal processing apparatus adaptively performing image compression and encoding/expansion and decoding processing such as discrete cosine transformation/inverse discrete cosine transformation, quantization/inverse quantization, motion vector detection, motion compensation, inner product computation, image data addition, and image data difference processing, etc. for blocks of image data of m ×n size, said adaptive video signal processing apparatus characterized in that it is provided with a plurality of processing units provided in parallel, each of which having an extended arithmetic and logic unit performing addition, subtraction, various logical computations, comparisons of magnitude, computation of absolute values of differences, and butterfly addition and subtraction processing; a first internal pipeline memory provided at a stage after the extended arithmetic and logic unit, a multiplier unit provided at a stage after the first internal pipeline memory, a coefficient memory supplying a coefficient to the multiplier unit, a second internal pipeline memory provided at a stage after it in the multiplier unit, an accumulation processing unit provided at a stage after the second internal pipeline memory, and a third internal pipeline memory provided at a stage after it in the accumulation processing unit;

mutually connected pipeline memories disposed so as to connect adjoining processing units among these plurality of parallel processing units; and data selectors which selectively apply the input data to the aforesaid plurality of processing units, wherein adjoining processing units are coupled via the aforesaid mutually connected pipeline memories and, the internal pipeline memories in the aforesaid processing units are selected to constitute a predetermined data flow path, thereby to perform a desired video signal processing.

In the above configuration, by providing a plurality of the said extended arithmetic and logic units, multipliers, and accumulators and suitably switching the configurations of connection of the processors in the processing units and the configurations of connection among the processing units, it is possible to perform pipeline processing of the element processing of image CODEC in parallel.

A more detailed explanation will be given of various processing operations.

(1) Where a discrete cosine transformation processing and inverse discrete cosine transformation processing are carried out, a terminal receiving as its input the discrete cosine transformation processing data is provided in the first stage processing unit of the aforesaid plurality of processing units, and a terminal receiving as its input the inverse discrete cosine transformation processing data is provided in the final stage processing unit of the aforesaid plurality of processing units.

(2) When the butterfly computation and the pipeline memory processing are carried out a plurality of times using blocks of image data of m×n size, the aforesaid discrete cosine transformation processing data is input to the extended arithmetic and logic units in a plurality of processing units excluding the aforesaid final stage processing unit, the results of processing in the extended arithmetic and logic units are output to the adjoining mutually connected pipeline memories described before, the data of the final stage of the mutually connected pipeline memories is input to the multiplier units in all processing units, and the results of that multiplication are accumulated in the aforesaid accumulation unit.

(3) Also, when the pipeline memory processing and the butterfly computation are carried out a plurality of times to perform inverse discrete cosine transformation processing using blocks of image data of m×n size, (a) the aforesaid discrete cosine transformation processing data is input to the multiplier units in all processing units and the results of multiplication are accumulated at the accumulation unit, (b) the output is input to the extended arithmetic and logic units in the plurality of processing units excluding the aforesaid initial stage processing unit and the results of processing in the extended arithmetic and logic units are output to the adjoining mutually connected pipeline memories described before.

(4) When quantization processing is carried out, the output terminal of the multiplier unit of a first processing unit in adjoining processing units is connected to the input terminal of the multiplier unit of the second processing unit, the result of multiplication of the second multiplier unit is input to an accumulation unit at a stage after the same, and the data to be quantized is input to the aforesaid first multiplier unit.

(5) When performing inverse quantization processing, the output terminal of the multiplier unit of a first processing unit in adjoining processing units is connected to the input terminal of the multiplier unit of the second processing unit, the result of multiplication of the second processing unit is input to the accumulation unit at a stage after the same, the data to be inverse quantized and the constant are input to the first processing unit, and the result of that computation is input to the first multiplier unit.

(6) At the motion vector detection processing, the extended arithmetic and logic units in all processing units are connected to the accumulation processing unit, and the two sets of data covered by the processing for detection of the motion vector are input to the aforesaid extended arithmetic and logic units.

(7) At the virtual pixel production processing in motion compensation, the extended arithmetic and logic units in all processing units are connected to the accumulation processing unit, and two sets of data covered by the processing for production of a virtual pixel in the motion compensation are input to the aforesaid extended arithmetic and logic units.

(8) At predictive pixel production processing in motion compensation, the output of one multiplier unit of adjoining processing units is supplied to one input terminal of the other extended arithmetic and logic unit, the output of the other multiplier unit is supplied to the other input terminal of the other extended arithmetic and logic unit, and the result of computation of the other extended arithmetic and logic unit is accumulated in the other accumulation unit.

(9) At inner product computation processing, the data covered by the processing of the inner product is input to the multiplier units in all processing units, and the results of the multiplication are accumulated in the corresponding accumulation unit.

(10) At image data addition processing or at image data subtraction processing, the data to be processed is input to the extended arithmetic and logic units in all processing units and the results of processing are output.

Preferably, in each processing unit, the extended arithmetic and logic unit, multiplier unit, and accumulation computation unit perform the pipeline processing.

More preferably, the adaptive video signal processing apparatus operates by a "single instruction stream-multiple data stream (SIMD)" control system for performing multiple data stream processing by a single instruction stream.

Specifically, the aforesaid extended arithmetic and logic unit has:

a positive/negative inverter which inverts the polarity of a first input data;

a first data selector which is provided at a stage after the positive/negative inverter and selectively outputs the aforesaid first input data or the aforesaid polarity-inverted first data;

an adder adding the selected output data of the first data selector and a second input data;

a subtracter which subtracts the aforesaid second input data from the aforesaid first input data;

a logical processor which performs the logical processing of the aforesaid first input data and the aforesaid second data such as a logical OR, logical AND, exclusive logical OR, negation, etc.;

a positive/negative decision unit receiving as its input the output of the aforesaid adder and the aforesaid subtracter and performing the positive/negative decision;

a second data selector receiving as its inputs the outputs of the aforesaid adder, the aforesaid subtracter, and the aforesaid positive/negative decision unit and selectively outputting the same; and a first output terminal connected to the second data selector;

a second output terminal connected to the aforesaid subtracter, and any of addition, subtraction, various types of logical computations, comparisons of magnitude, computation of absolute values of differences, and butterfly addition and subtraction processing being carried out by combining the above-mentioned circuits.

BRIEF DESCRIPTION OF THE DRAWINGS

The above objects and features and other objects and features will become more apparent from the following description made with reference to the accompanying drawings, in which:

FIG. 4 is a view of the configuration of the computation pipeline having the highest degree of freedom, in which FIGS. 4A to 4D are views indicating the operation modes of four systems of the processing units;

FIG. 10 is a view of the configuration of a computation pipeline of an 8×8 IDCT;

FIG. 11 is a view of the configuration of a computation pipeline of the adaptive video signal processing apparatus at the time of DCT processing according to an embodiment of the present invention, in which FIGS. 11A to 11D are views indicating the operation modes of four systems of the processing units;

FIG. 12 is a view of the configuration of a computation pipeline of the adaptive video signal processing apparatus at the time of IDCT processing according to an embodiment of the present invention, in which

FIG. 13 is a view of the configuration of the computation pipeline of the adaptive video signal processing apparatus at the time of quantization processing according to an embodiment of the present invention, in which FIGS. 13A to 13D are views indicating the operation modes of four systems of the processing unit;

FIG. 14 is a view of the configuration of the computation pipeline of the adaptive video signal processing apparatus at the time of inverse quantization processing according to an embodiment of the present invention, in which FIGS. 14A to 14D are views indicating the operation modes of four systems of the processing units;

FIG. 15 is a view of the configuration of the computation pipeline of the adaptive video signal processing apparatus at the time of motion vector detection processing according to an embodiment of the present invention, in which

FIG. 16 is a view showing a virtual pixel production rule of the motion compensation processing of image CODEC;

FIG. 17 is a view of the configuration of the computation pipeline at the time of virtual pixel production processing in a motion compensation according to an embodiment of the present invention, in which

FIG. 18 is a view of the configuration of the computation pipeline at the time of predictive pixel production processing in the motion compensation according to an embodiment of the present invention, in which

FIG. 19 is a view of the configuration of the computation pipeline at the time of filtering processing according to an embodiment of the present invention, in which FIGS. 19A to 19D are views indicating the operation modes of four systems of the processing units; and FIG. 20 is a view of the configuration of the computation pipeline at the time of image addition or image subtraction processing according to an embodiment of the present invention, in which FIG. 20A to 20D are views indicating the operation modes of four systems of the processing units.

BEST MODE FOR CARRYING OUT THE INVENTION

A detailed description will be made below of an adaptive video signal processing apparatus of an embodiment of the present invention referring to the figures.

Also, in the embodiment of the present invention, similar to the prior art, a DSP of a "single instruction stream-multiple data stream (SIMD)" control system which has been proposed in the above-described reference, wherein four sets of processing units operate in parallel by a single instruction flow will be considered.

As the prerequisite, it is assumed that each processing unit comprises three types of processors of an ALU performing addition, subtraction, and logical computations, a multiplier, and an accumulator. Also, for ease of the explanation, it is assumed that each processor completes the computation in 1 clock cycle. Accordingly, this DSP can execute 12 computations at the maximum in one clock cycle. Further, it is assumed that this DSP has a data memory for supplying the data to the processors and storing the data from the processors inside a chip or outside the chip.

Below, an explanation will be made of the configuration of the processing unit, then the operation of the processing unit in the element processing of image CODEC will be explained.

Note that, the element processings of image CODEC exemplified here are the element processings mainly used at the MPEG:

(1) Configuration of processing unit

Figure 1:
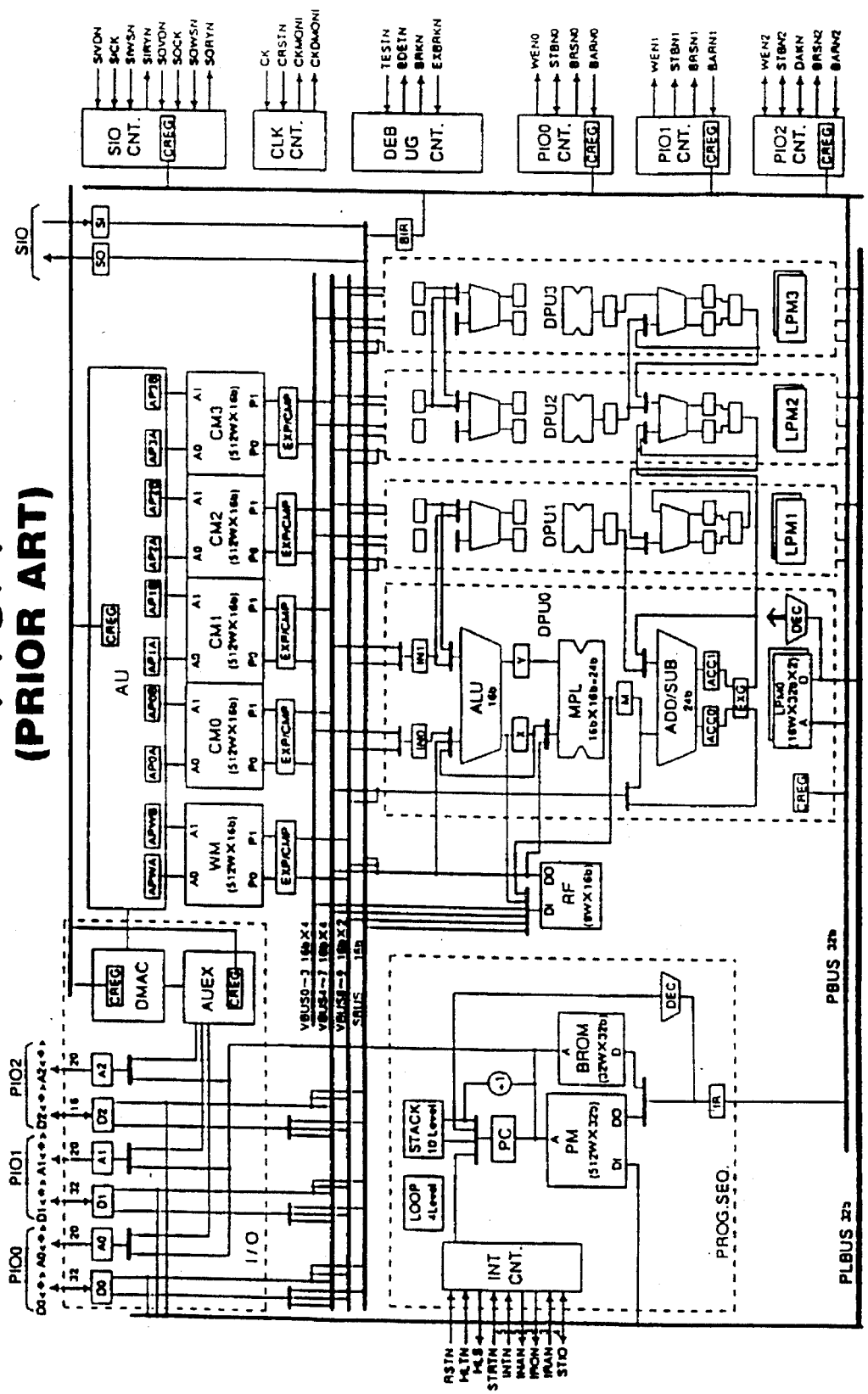
FIG. 1 is view of the configuration of a processing apparatus of a "single instruction stream-multiple data stream (SIMD)" control system.
Figure 2:
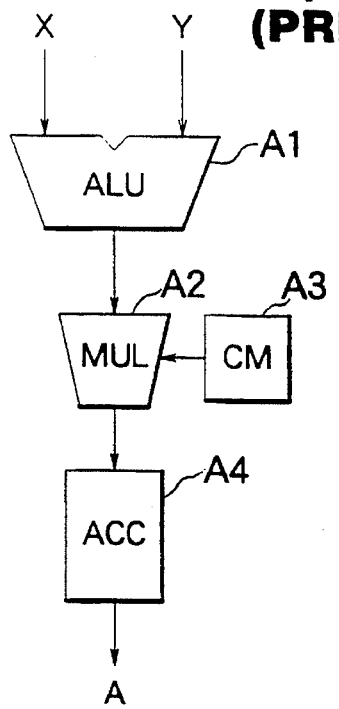
FIG. 2 is a view showing an example of the computation pipeline.
Figure 3:
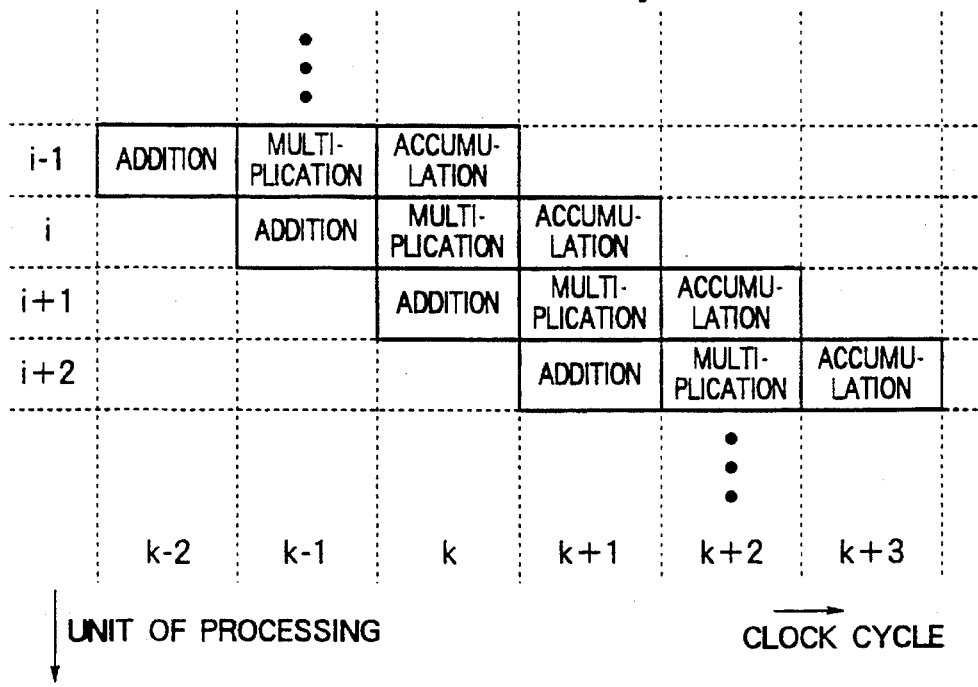
FIG. 3 is a graph showing a timing chart in the computation pipeline processing of FIG. 2.
Figure 4:
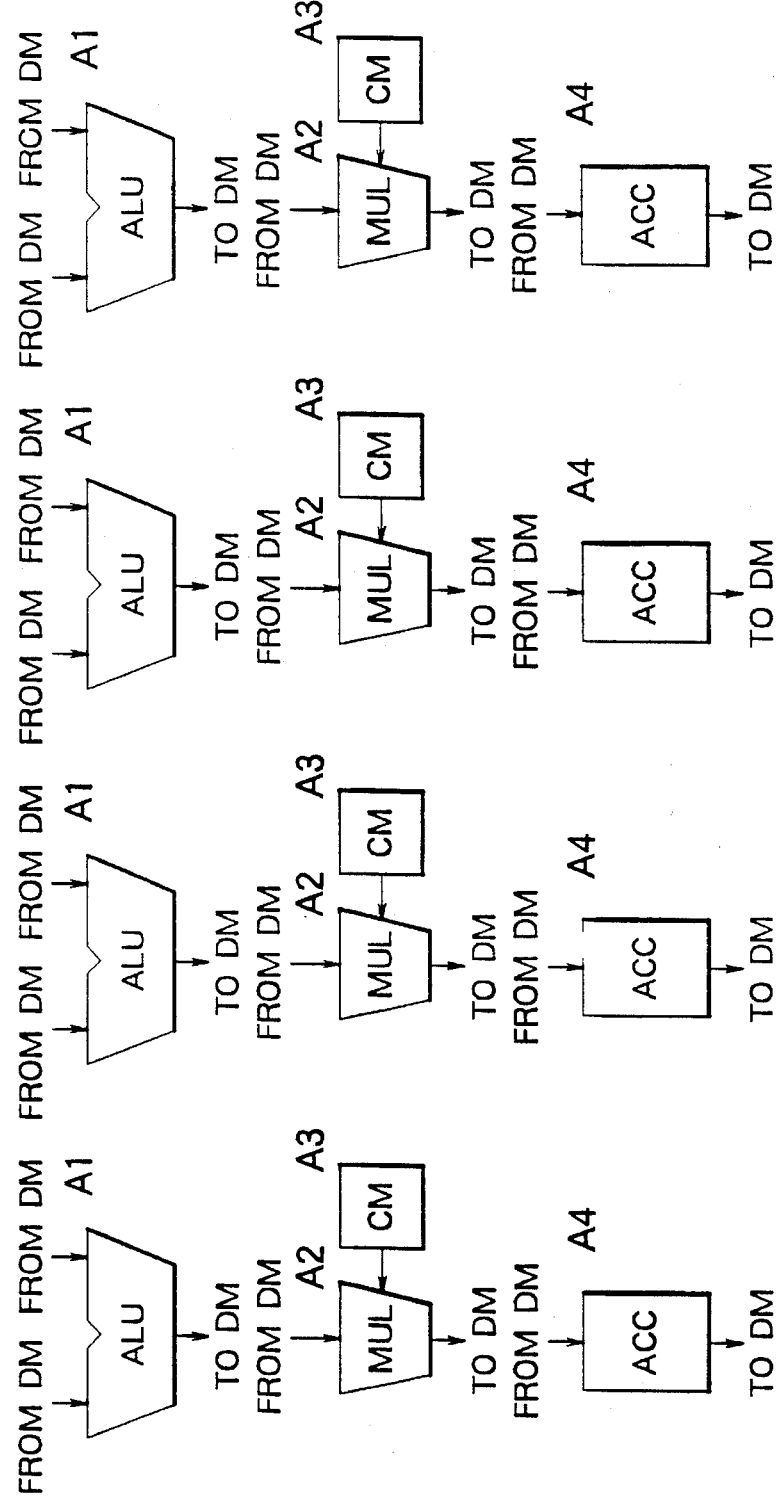
Figure 5:
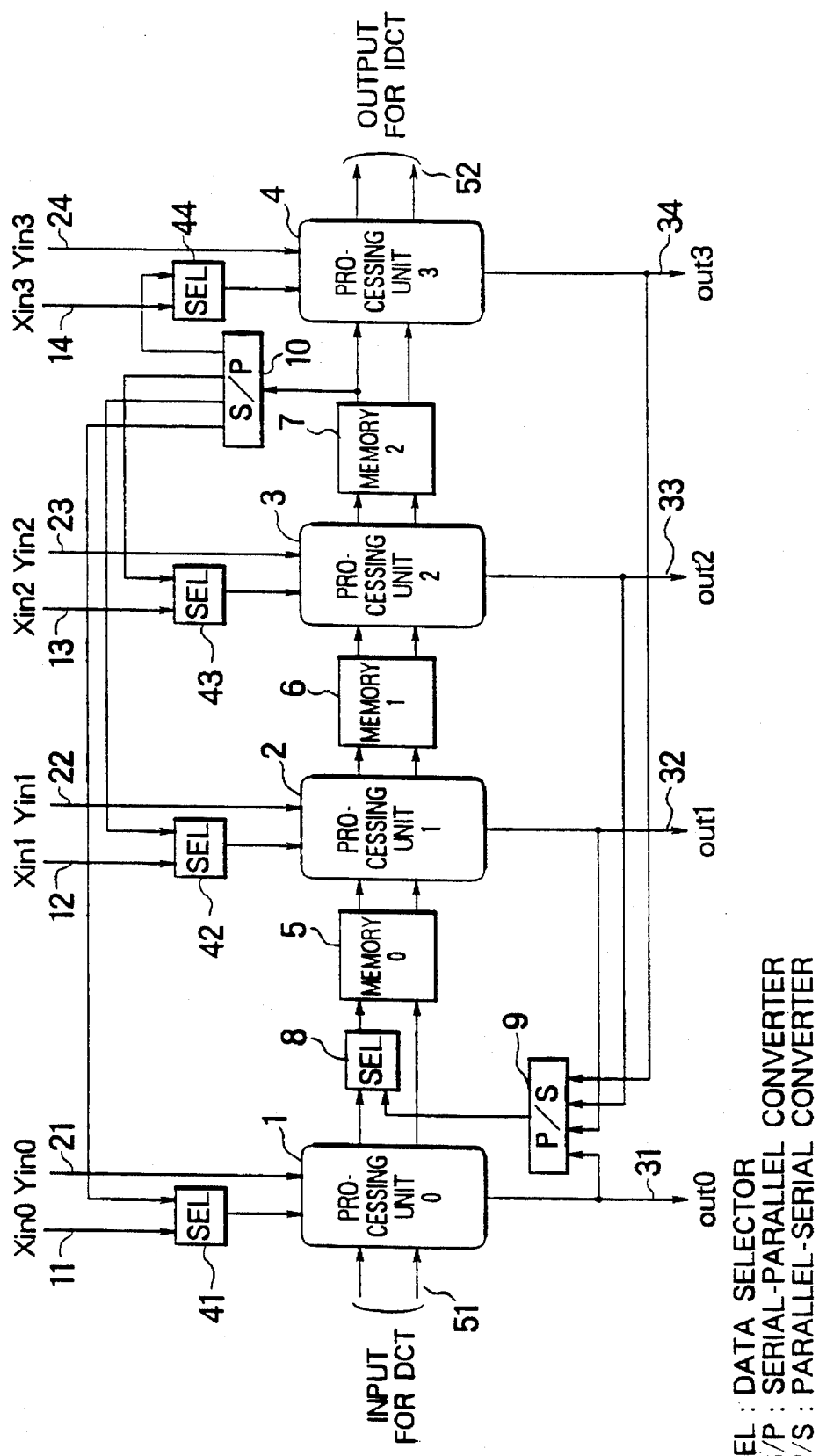
FIG. 5 is a view of the configuration of an adaptive video signal processing apparatus showing the configuration of connection of processing units according to an embodiment of the present invention.

FIG. 5 shows a configuration of connection among four sets of processing units 1 to 4. In FIG. 5, the data memory is not illustrated.

In actuality, data input terminals (Xin0 to Xin3) 11 to 14, data input terminals (Yin0 to Yin3), and data output terminals (Out1 to Out3) 31 to 34 are connected via a certain mutual connection network to the data memory (not illustrated).

Here, for ease of explanation, it is assumed that the data memory can supply data to the above-described eight data input terminals 11 to 14 and 21 to 24 at every clock cycle and can simultaneously write the data from the above-described four data output terminals 31 to 34 every clock cycle. Namely, it is assumed that the processing units 1 to 4 and the data memory (not illustrated) are connected by a mutual connection network equipped with the above-described data transfer ability.

Also, it is assumed that the memories connecting the processing units 1 to 4 (hereinafter referred to as mutually connected pipeline memories) 0(5), 1(6) and 2(7), a parallel-serial converter 9, a serial-parallel converter 10, and data selectors 8, 41 to 44 become necessary when realizing macro-computation pipeline configuration in a high speed computation algorithm of the discrete cosine transformation/inverse discrete cosine transformation (or inverse discrete cosine transformation) (DCT/IDCT) mentioned later.

Note that, also the DCT input terminal 51 and IDCT input terminal 52 shown in FIG. 5 are connected via a mutual connection network (not illustrated) to the data memory (not illustrated), so data input/output every clock cycle becomes possible.

Figure 6:
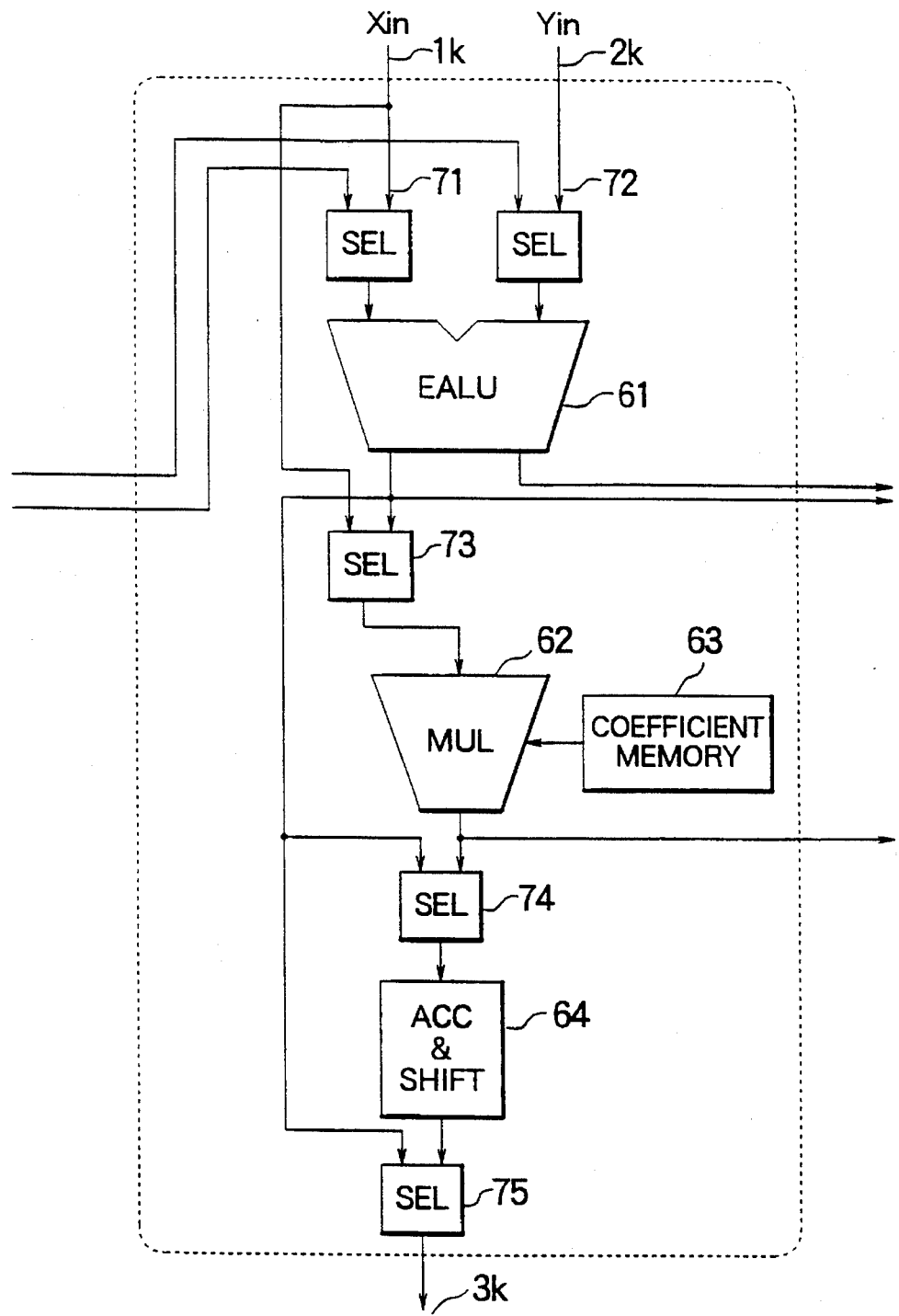
FIG. 6 is a view showing the configuration of processing units 0 and 2 according to an embodiment of the present invention.
Figure 7:
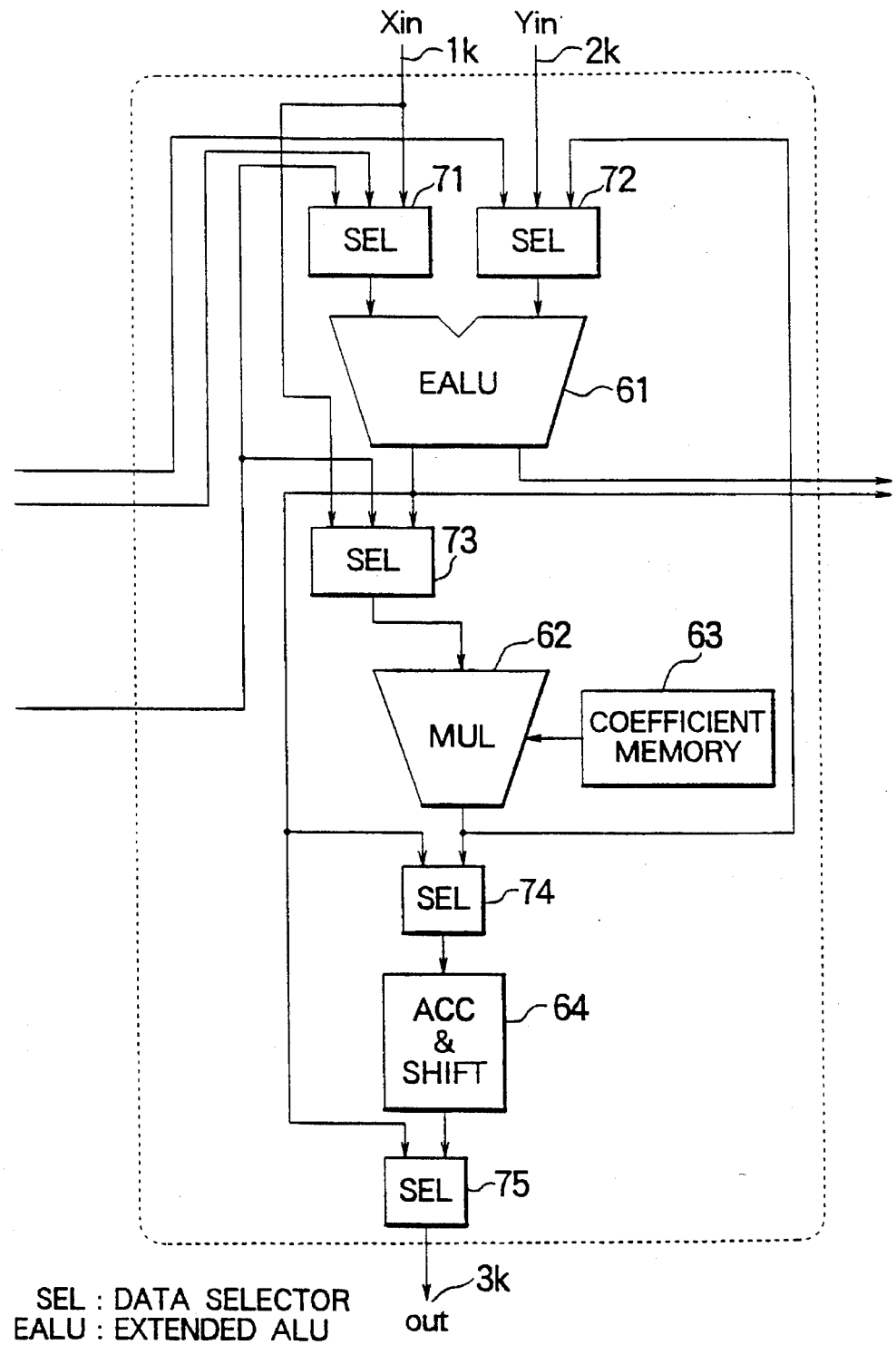
FIG. 7 is a view showing the configuration of processing units 1 and 3 according to an embodiment of the present invention.

The internal configuration of a processing unit will be shown in FIG. 6 and FIG. 7.

FIG. 6 is a view of the configuration of the internal portion of a processing unit 0(1) and a processing unit 2(3); and FIG. 7 is a view of the configuration of the internal portion of a processing unit 1(2) and a processing unit 3(4).

As shown in FIG. 6 and FIG. 7, in the processing unit, an extended arithmetic and logic unit (EALU) 61 performing computations such as addition, subtraction, logical computations, and the butterfly computation mentioned later, etc., a coefficient memory 63, a multiplier 62, an accumulator 64 equipped with a shift function for performing an accumulation and shift computation, and further input terminals (Xink) 1$k$ (k indicates k-th order) and (Yink) 2$k$, and an output terminal (Outk) 3$k$ are mutually connected via data selectors 71 to 75. For ease of explanation, it is assumed that these processors all complete their computations in one clock cycle. Accordingly, an internal pipeline register (illustration is omitted) provided at a stage after the processors 61, 62 and 64 exists.

By adopting such a configuration of connection of the processors 61, 62, and 63 and the internal pipeline memory, it becomes possible to change the path of data among the processors 61, 62, and 64 via the internal pipeline memory according to the settings of the data selectors 71 to 75. Accordingly, this processing unit can adopt a variable-configuration computation pipeline configuration consisting of one to three stages.

The difference between the processing unit shown in FIG. 6 and the processing unit shown in FIG. 7 is that a configuration in which a third input data is supplied to the data selectors 71 and 73 is adopted for the processing unit shown in FIG. 7.

Figure 8:
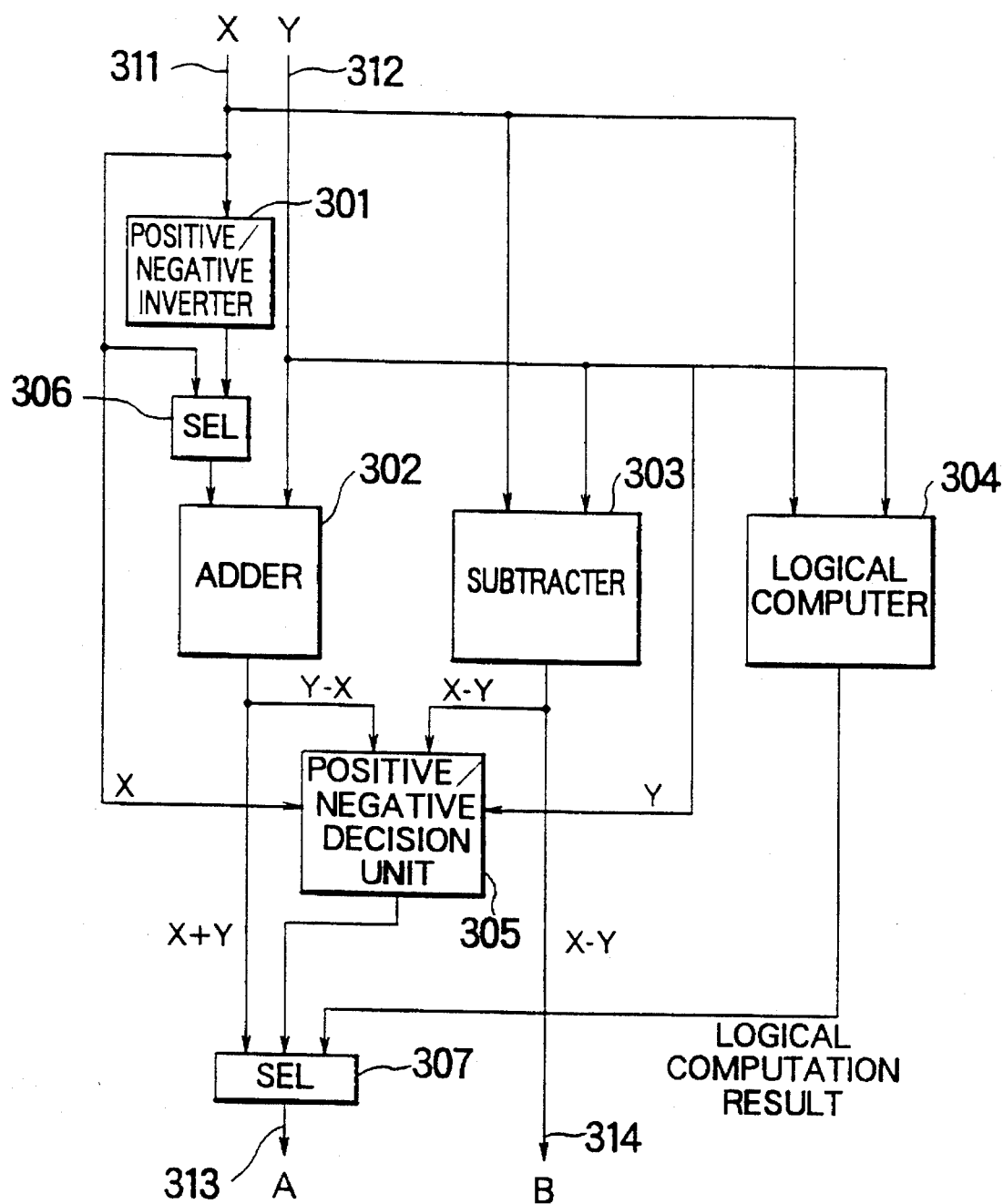
FIG. 8 is a view of the configuration of an extended arithmetic and logic unit (EALU) according to an embodiment of the present invention.

FIG. 8 shows the configuration of the extended arithmetic and logic unit (EALU) 61.

The EALU 61 has a positive/negative inverter 301, a data selector 306, an adder 302, a subtracter 303, a logical computer 304, a positive/negative decision unit 305, and a data selector 307. This EALU 61 is provided with the usual basic functions of an ALU, that is, addition, subtraction, and logical computations (negation, logical OR, logical AND, exclusive logical OR, etc.), plus magnitude comparison computations min(X, Y) and max(X, Y), absolute difference computations |X−Y|, and a butterfly computation (addition and subtraction are simultaneously carried out for two inputs) as the extended functions.

These basic functions and extended functions are realized by adequately connecting the above-mentioned various types of processors 301, 302, 303, 304, and 305.

Below, an explanation will be made as to how the above-described basic functions and extended functions are realized by the EALU 61 using various types of processors.

Addition

The addition of the two input data X and Y supplied to the input terminals 311 and 312 is realized using the adder 302. For the input data X, the data selector 306 is set in advance so that the data X not passing the positive/negative inverter 301 is supplied to the adder 302. By this, the result of the addition (X+Y) is output from the adder 302. The data selector 307 outputs the result of addition of the adder 302 as the output of the EALU 61 from an A-side output terminal 313.

Subtraction

The computation of the two input data (X−Y) supplied to the input terminals 311 and 312 is realized using the subtracter 303. The result of the subtraction (X−Y) is output from the subtracter 83. This result of subtraction is output from a B-side output terminal 314.

Logical computation

The logical computation of the two input data (X, Y) supplied to the input terminals 311 and 312 is realized using the logical processor 304. The logical processor 30& performs logical computation such as negation, logical OR, logical AND, exclusive logical OR, etc. The results of the computation are output via the data selector 307 from the A-side output terminal 313 as the results of the EALU 61.

Magnitude comparison computation: min(X, Y), max(X, Y)

The comparison of the magnitude of the two input data (X, Y) supplied to the input terminals 311 and 312 is carried out using the positive/negative inverter 301, the adder 302, the subtracter 303, and the positive/negative decision unit 305. The input data X is inverted at the positive/negative inverter 301, and the inverted data (−X) is supplied via the data selector 306 to the adder 302. By this, the result of subtraction (Y−X) is output from the adder 302. On the other hand, the computation of the subtraction (X−Y) is carried out at the subtracter 303. The result of addition (Y−X) and the result of subtraction (X−Y) are supplied to the positive/negative decision unit 305, and the magnitude comparison and decision with the input data X and Y are carried out. The positive/negative decision unit 305 decides on the magnitude according to the following criteria for decision:

1. Minimum value: min(X, Y)
   When (Y−X)≧0, minimum value=X
   When (Y−X)<0, minimum value=Y 2. Maximum value: max(X, Y)
   When (X−Y)≧0, maximum value=Y
   When (X−Y)<0, maximum value=X Note, the minimum value and the maximum value cannot be simultaneously output. The data selector 307 outputs the output of the positive/negative inverter 305 as the output of the EALU 61 from the A-side output terminal 313.

Differential absolute value computation |X−Y|

The differential absolute value computation of the two input data (X, Y) supplied to the input terminals 311 and 312 is carried out using the positive/negative inverter 301, adder 302, subtracter 303 and the positive/negative decision unit 305. For the input data X, the data selector 306 is set in advance so that −X, the polarity of which being inverted at the positive/negative inverter 301, is selectively output from the data selector 306 to the adder 302. The adder 302 performs the addition (Y–X) and the subtracter 303 performs the subtraction (X–Y). The results of these computations are input to the positive/negative decision unit 305. The positive/negative decision unit 305 performs the following computation of the absolute value of the difference:

When (Y–X)≧0, differential absolute value=Y–X

When (X–Y)<0, differential absolute value=X–Y

The data selector 307 outputs the above-described computed absolute value of the difference from the A-side output terminal 313.

Butterfly computation

The butterfly computation for the two input data (X, Y) supplied to the input terminals 311 and 312 is realized using the adder 301 and the subtracter 303. The data selector 306 is preliminarily set so that the input data X is supplied to the adder 302 without passing through the positive/negative inverter 301. The adder 302 performs the addition (X+Y) and the subtracter 303 performs the subtraction (X–Y). Simultaneously with the data selector 307 outputting the output of the adder 302 as the output of the EALU 61 from the A-side output terminal 313, the result of subtraction of the subtracter 303 is output from the B-side output terminal 314.

Only in the case of this butterfly computation, the EALU 61 operates as a two-input two-output processor. In the above-mentioned other computations, the EALU 61 operates as a two-input one-output processor.

Below, the operation of the processing unit in the respective element processings of image CODEC such as DCT/IDCT, quantization, etc. will be individually explained.

Discrete cosine transformation/inverse discrete cosine transformation (DCT/IDCT)

In the element processing of the discrete cosine transformation/inverse discrete cosine transformation (DCT/IDCT), in the processing unit in the embodiment of the present invention, the configuration of the macro-computation pipeline of the butterfly computation (addition and subtraction) and the multiplication and addition adapted to the high speed computation algorithm as proposed in the specification and figures of Japanese Patent Application No. 4-338183 previously applied for by the present applicant is realized in the following way.

Figure 9:
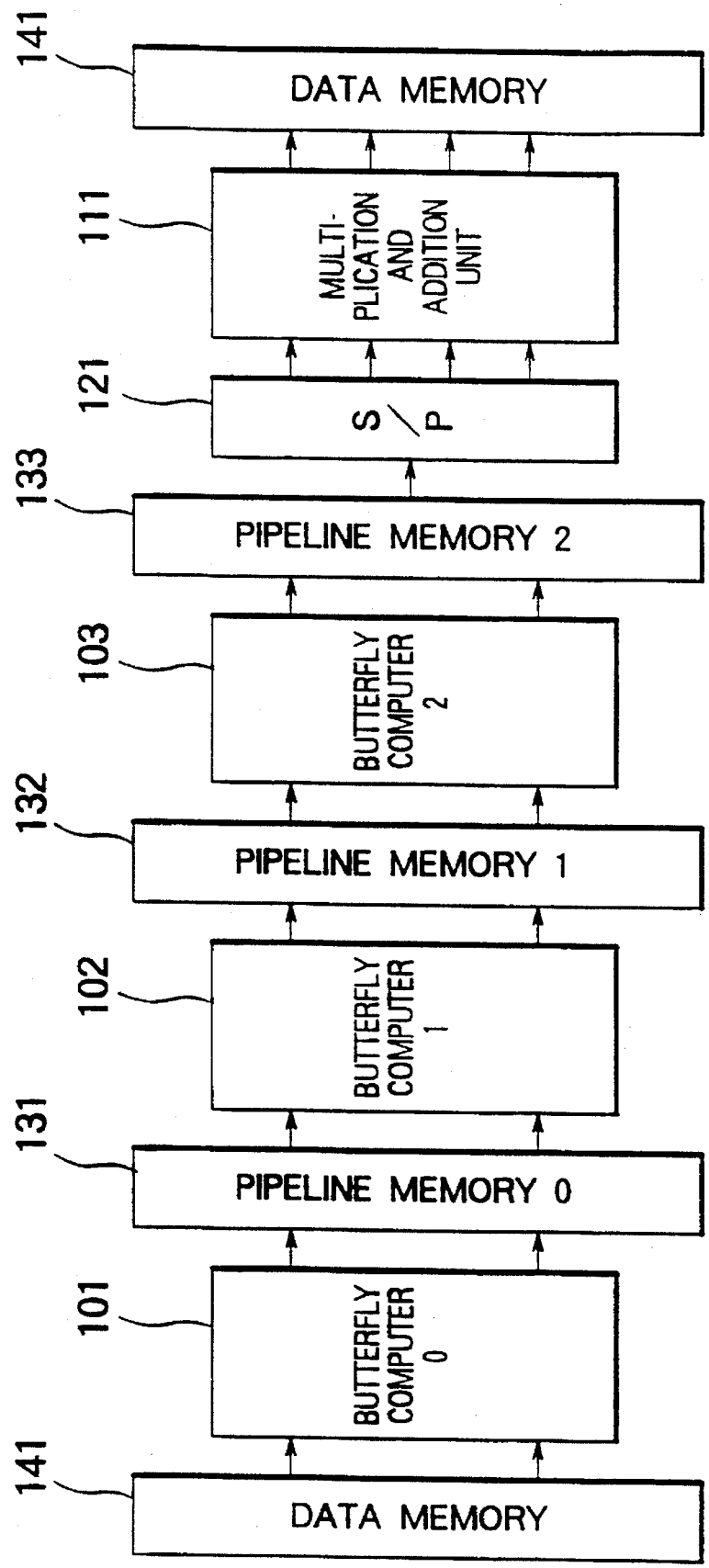
FIG. 9 is a view of the configuration of a computation pipeline of an 8×8 DCT.
Figures 12A, 12B, 12C, 12D:
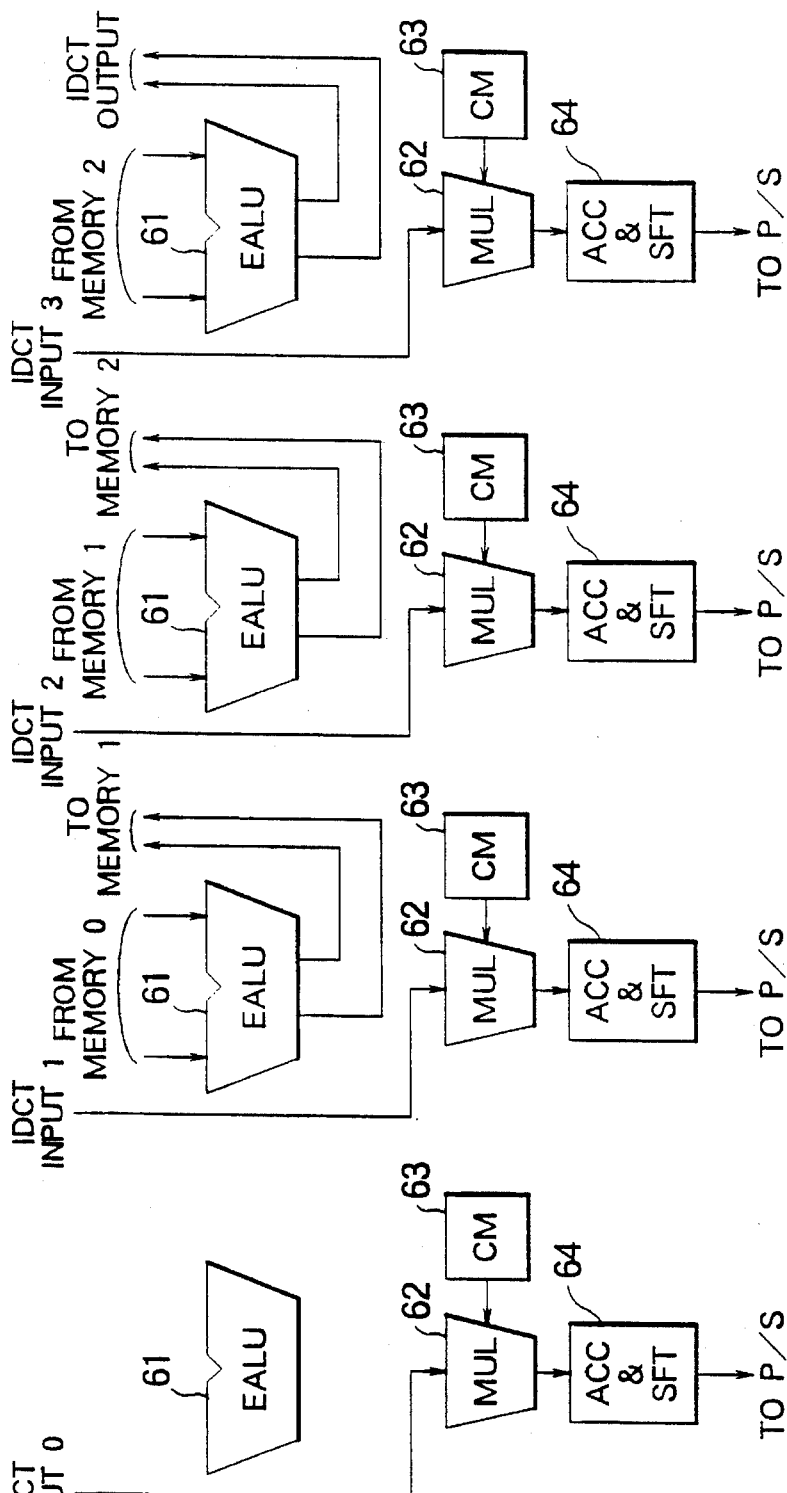
FIGS. 12A to 12D are views indicating the operation modes of four systems of the processing units.
Figures 15A, 15B, 15C, 15D:
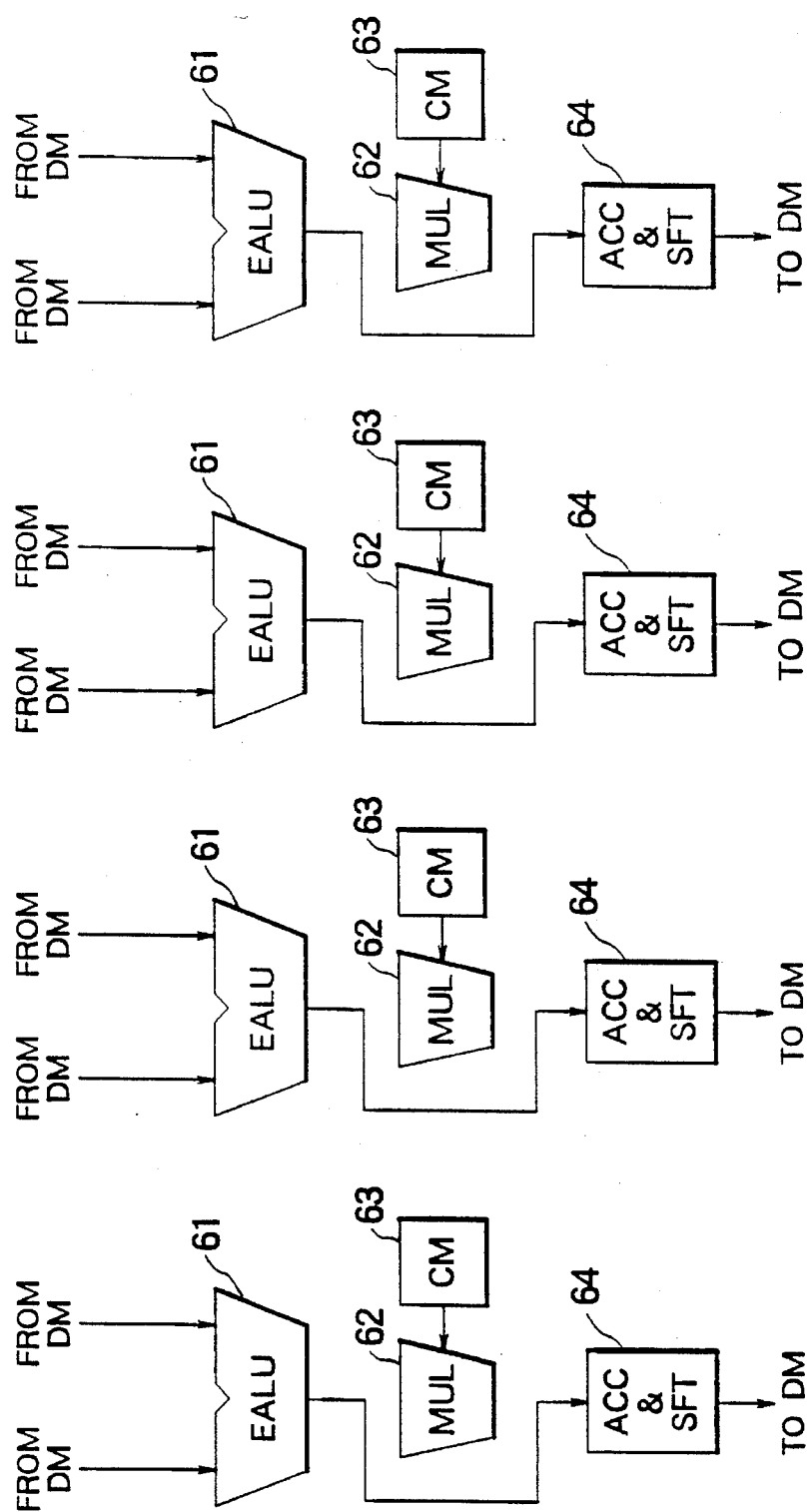
FIGS. 15A to 15D are views indicating the operation modes of four systems of the processing units.
Figures 17A, 17B, 17C, 17D:
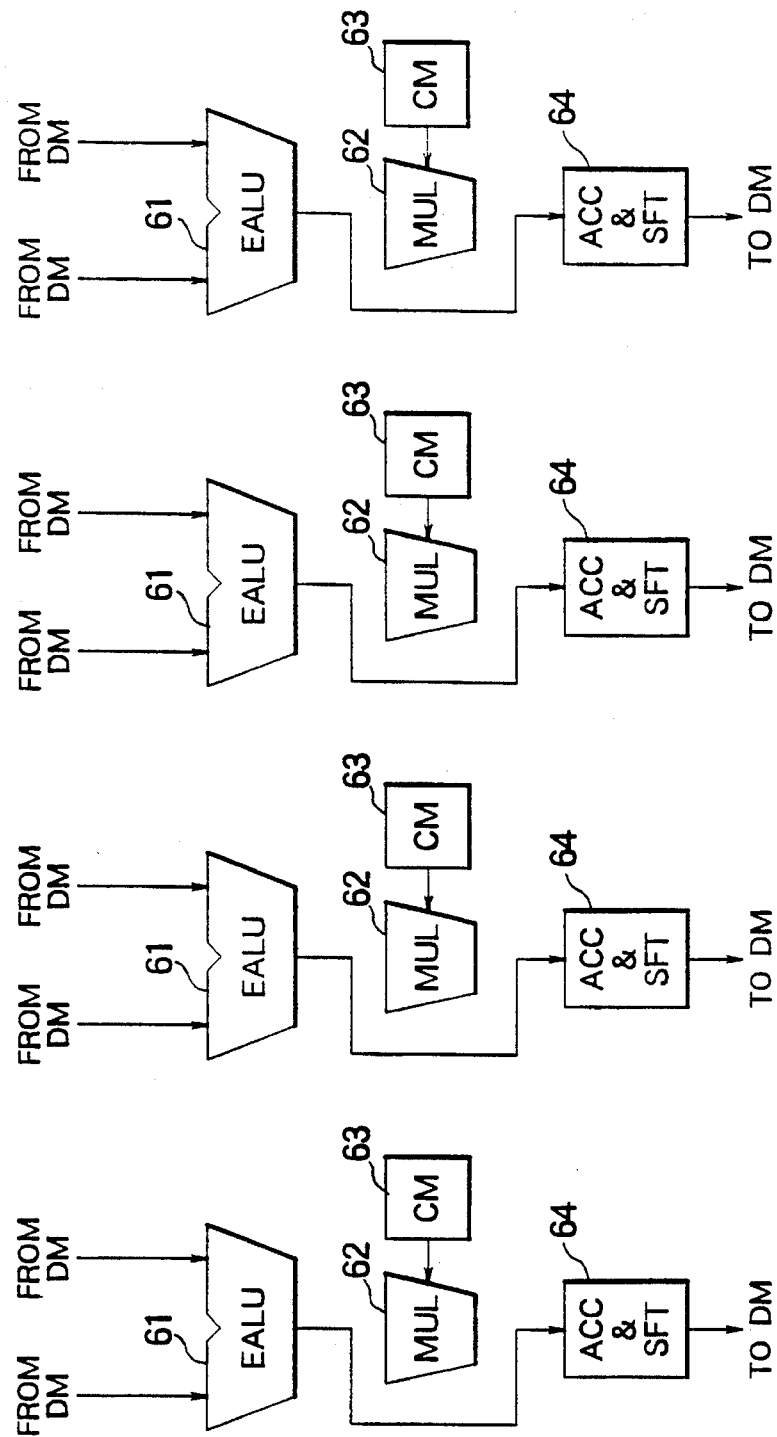
FIGS. 17A to 17D are views indicating the operation modes of four systems of the processing units.
Figures 18A, 18B, 18C, 18D:
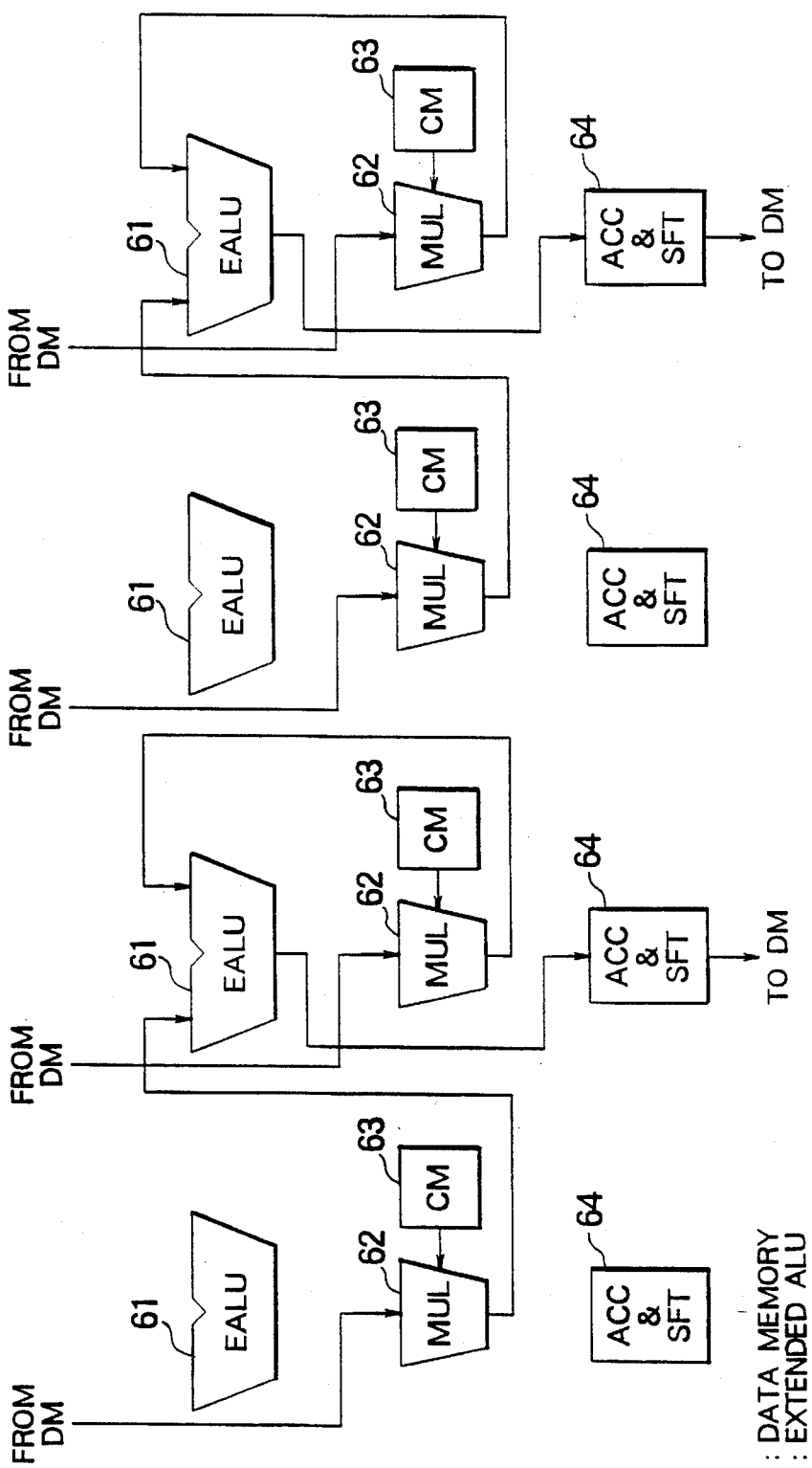
FIGS. 18A to 18D are views indicating the operation modes of four systems of the processing units.

FIG. 9 is a schematic view of the configuration of the computation pipeline of an 8×8 DCT, and FIG. 10 is a schematic view of the configuration of the computation pipeline of an 8×8 IDCT.

The unit of processing of these computation pipelines is a 8×8 image block (64 pixels), so the configuration becomes one of four computation pipeline stages via the pipeline memories 131 to 133. Accordingly, unlike a computation pipeline performing pipeline processing every clock cycle by the usual pixel unit, it performs the pipeline processing every 64 clock cycles, and therefore it can be considered to be a macro-computation pipeline.

Below, a simple explanation will be made of a high speed computation algorithm of the above-described computation pipeline taking as an example the 8×8 DCT.

By the matrix decomposition as proposed in the aforementioned patent application, Japanese Patent Application No. 4-338183, the 8×8 DCT can be realized by performing the butterfly computation 165 number of times (addition 165 number of times and subtraction 165 number of times) with respect to 8×8 image blocks (64 pixels) and further performing multiplication and addition 220 number of times (multiplication 220 number of times and accumulation 220 number of times). Accordingly, by adopting the configuration of four computation pipeline stages as shown in FIG. 9, that is, a circuit configuration comprising three butterfly computers 101 to 103 and four multiplication and addition units 111, it becomes possible to perform the computation pipeline processing in a 64 clock cycle period (ideally 55 clock cycles) to calculate the 8×8 DCT.

Moreover, also for an 8×8 IDCT, only the order of the multiplication and addition and the butterfly computation are switched. The amount of the computation and the number of stages of the computation pipeline are not changed.

Note that, in the above-mentioned application, so as to reduce the number of the multiplication and addition units to three, a step for further reducing the number of times of the multiplication and addition was taken, but in the embodiment of the present invention, since it is assumed that the number of the multiplication and addition units is four, this step is not necessary.

FIGS. 11A to 11D show the configuration of connection (data path) of the processors and memories where the configuration of the computation pipeline of the 8×8 IDCT mentioned above is realized by using the processing unit in the embodiment of the present invention. FIGS. 11A to 11D show the operation modes of four systems of the processing units.

As shown in FIGS. 11A to 11D and FIG. 5, the EALUs 61 in the processing units 0(1), 1(2), and 2(3) are pipeline-connected via the memories 0(5), 1(6) and 2(7), that is, the pipeline memories 5, 6, and 7. Further, the output of the EALU 61 of the processing unit 2(3) is connected via the serial-parallel converter 10 and data selectors 41 to 44 to four multipliers 62, and the output of each multiplier 62 is pipeline-connected to the accumulator 64 equipped with the shift function. Note that, the EALU 61 at this time has two inputs and two outputs since it performs the butterfly computation, which is an extended function, as the above-mentioned EALU.

By adopting such a configuration of connection of the processors and memories, a macro-computation pipeline configuration as shown in FIG. 9 is realized.

Also, FIGS. 12A to 12D show the configuration of connection (data path) of the processors and memories where the configuration of the computation pipeline of the 8×8 IDCT mentioned above is realized by using the processing unit in the embodiment of the present invention. FIGS. 12A to 12D show the operation modes of four systems of the processing units.

As shown in FIGS. 12A to 12D and FIG. 5, four multipliers 62 of each processing unit are pipeline-connected to the accumulators 64 equipped with the shift function, respectively. Further, the outputs of all accumulators 64 equipped with the shift function are connected via the parallel-serial converter 9 and the data selector 8 to the memory 0(5). Also, the EALUs 61 of the processing units 1(2), 2(3), and 3(4) are pipeline-connected via the memories 0(5), 1(6), and 2(7), that is, the pipeline memories 5, 6, and 7. Note that, the EALU 61 at this time has two inputs and two outputs since it performs a butterfly computation, which is an extended function, as the above-mentioned EALU.

By adopting such a configuration of connection of the processors and memories, a macro-computation pipeline configuration as shown in FIG. 10 is realized.

Quantization/inverse quantization processing (A) Quantization

In the quantization processing of image CODEC, a pattern of computation of continuously performing multiplication as in the following equation 1 and further performing the shift computation exists. This is the most complex computation pattern in the quantization processing.

$$y = 8 \cdot x \cdot 1/W \cdot 1/QP \quad (1)$$

where,

X is the pixel value before the quantization;

Y expresses the pixel value after the quantization;

W indicates the coefficient of the quantized matrix; and

QP expresses the quantization scale parameter.

FIGS. 13A to 13D show the configuration of connection (data path) of the processors where the computation of the above equation is realized using the processing unit in the embodiment of the present invention. FIG. 13A to 13D show the operation modes of four systems of processing unit.

As shown in FIGS. 13A to 13D, a data path of pipeline-connected two multipliers 62 and the accumulator 64 equipped with the shift function is realized, whereby the computation pattern of the above equation can be processed by one computation pipeline without divisional processing. In the computation pattern of this quantization processing, in the configuration of the processing unit in the embodiment of the present invention, two three-stage computation pipelines can be realized as shown in FIGS. 13A to 13D. By adopting such a computation pipeline configuration, the quantization with respect to the all pixels in the image block can be performed by pipeline processing in two parallel systems.

(B) Inverse quantization

In the inverse quantization processing of image CODEC, a pattern of computation of performing a shift and addition as in the following equation 2 and then continuously performing the multiplication and further performing the shift computation exists. This is the most complex computation pattern in the inverse quantization processing.

$$x = 1/16 \cdot \{(2 \cdot y + K) \cdot W \cdot QP\} \quad (2)$$

where,

X is the pixel value before the quantization;

Y expresses the pixel value after the quantization;

K expresses the constant which becomes necessary at the time of inverse quantization (K=0, 1 or −1)

W is the coefficient of the quantized matrix; and

QP expresses the quantization scale parameter.

FIGS. 14A to 14D show the configuration of connection (data path) of the processors where the computation of the above equation is realized using the processing unit of an embodiment of the present invention. FIGS. 14A to 14D show the operation modes of four systems of processing units.

As shown in FIGS. 14A to 14D, by constituting a data path pipeline-connecting the EALU 61, two multipliers 62, and the accumulator 64 equipped with the shift function, the computation pattern of the above equation can be realized by one computation pipeline without division. Note that, it is assumed that the shift and constant addition can be executed in the EALU 61 in one clock cycle. In this computation pattern of the inverse quantization processing, in the configuration of the processing unit in the embodiment of the present invention, two four-stage computation pipelines can be realized as shown in FIGS. 14A to 14D. By adopting such a computation pipeline configuration, the inverse quantization with respect to all pixels in the image block can be performed by pipeline processing in two parallel systems.

Motion vector detection

In the motion vector detection processing of image CODEC, a number of computations for addition of the absolute values of differences as in the following equation corresponding to the number of the motion vector candidates becomes necessary (note, in the case where a whole search of the block-matching method is adopted in the search algorithm).

$$\Sigma |x-y| \quad (3)$$

where,

X expresses the pixel value of the image block which becomes the reference of the motion vector search (called a reference block); and Y expresses the pixel value of the image block which becomes the object of the motion vector search (called a candidacy block).

FIGS. 15A to 15D show the configuration of connection (data path) of the processors where the computation of the above equation is realized using the processing unit of one embodiment of the present invention. FIGS. 15A to 15D show the operation modes of four systems of processing units.

As shown in FIGS. 15A to 15D, a data path pipeline-connecting the EALU 61 and the accumulator 64 equipped with the shift function is constituted, whereby the computation for addition of the absolute values of differences of the above equation can be realized by one computation pipeline without division. Note that, for the computation of the absolute values of the differences, the differential absolute value computation function, which is an extended function of the EALU 61 mentioned before, is used. In this computation for addition of the absolute values of differences of the motion vector detection processing, in the configuration of the processing unit in the embodiment of the present invention, four two-stage computation pipelines can be realized as shown in FIGS. 15A to 15D.

By adopting such a computation pipeline configuration, motion vector detection with respect to all candidate blocks can be performed by pipeline processing in four parallel systems.

Motion compensation (production of virtual pixel, production of predictive pixel)

The motion compensation processing in image CODEC is classified into various processing cases according to the value of the motion vector or the mode of the block. Among them, a case of performing the most complex computation will be considered.

At this time, the motion compensation processing is classified into two processings of the production of a virtual pixel and the production of a predictive pixel.

Below, an explanation will be made of how the configuration of the computation pipeline is adapted to each of the above-described two processings realized in the processing unit in the embodiment of the present invention.

(A) Production of the virtual pixel

Virtual pixel production processing is processing for performing interpolation among pixels along with a motion vector of a ½ pixel precision to produce a virtual pixel.

FIG. 16 shows the production rule of the virtual pixel. As seen from FIG. 16, the most complex virtual pixel production processing is a case where a central virtual pixel is produced from the four surrounding pixels.

$$a = \frac{1}{4}(x+y+z+w) \quad (4)$$

where, a expresses the virtual pixel; and x, y, z, and w express the four surrounding pixels.

FIGS. 17A to 17D show the configuration of connection (data path) of the processors where the computation of the above equation is realized using the processing unit in the embodiment of the present invention. FIGS. 17A to 17D show the operation modes of four systems of the processing units.

As shown in FIGS. 17A to 17D, a data path pipeline-connecting the EALU 61 and the accumulator 64 equipped with the shift function is constituted, whereby the computation pattern of the above equation can be realized by one computation pipeline without division.

In this virtual pixel production processing, in the configuration of the processing unit in one embodiment of the present invention, four two-stage computation pipelines can be realized as shown in FIGS. 17A to 17D.

By adopting such a computation pipeline configuration, production of a virtual pixel for all pixels in the image block can be performed by pipeline processing in four parallel systems.

(B) Production of predictive pixel

Predictive pixel production processing differs according to whether it is the mode of a monodirectional (forward or backward) motion compensation prediction or a bidirectional motion compensation prediction.

In the case of the monodirectional motion compensation prediction, it is sufficient if access is obtained to the frame memory merely according to the motion vector and the related image block is obtained.

However, in the case of bidirectional motion compensation prediction, the image blocks are obtained from two frame memories according to the two types of motion vectors in the forward direction and backward direction, respectively, and further these pixels are averaged according to the time distance to obtain the predictive value.

$$a = \frac{1}{16}\{A \cdot x + (16-A) \cdot y\} \quad (5)$$

where, a indicates the bidirectional motion compensation prediction value;

x and y indicate the forward and backward motion compensation prediction values, respectively; and A is a parameter determined according to the time distance of the two image blocks.

FIGS. 18A to 18D show the configuration of connection (data path) of the processors where the computation of the above equation is realized using the processing unit in one embodiment of the present invention. FIGS. 18A to 18D show the operation modes of four systems of the processing units.

As shown in FIGS. 18A to 18D, a data path making the outputs of the two multipliers 62 the input of the EALU 61 and further pipeline-connecting the accumulator 64 equipped with the shift function is constituted, whereby the computation pattern of the above equation can be realized by one computation pipeline without division.

In this predictive pixel production processing, in the configuration of the processing unit in the embodiment of the present invention, two three-stage computation pipelines can be realized as shown in FIGS. 18A to 18D.

By adopting such a computation pipeline configuration, predictive pixel production with respect to all pixels in the image block can be performed by pipeline processing in two parallel systems.

Filter (inner product computation)

Not restricted to image CODEC, the filtering processing is a basic element processing of image processing. Here, a case where primary filtering processing is carried out with respect to all pixels in the image block will be considered.

In the filtering processing, the inner product computation of the following equation becomes necessary.

$$\Sigma c \cdot x \quad (6)$$

where, c indicates the filter coefficient; and x indicates the pixel in the image block FIGS. 19A to 19D show the configuration of connection (data path) of the processors where the computation of the above equation is realized using the processing unit of the embodiment of the present invention. FIGS. 19A to 19D show the operation modes of four systems of the processing units.

As shown in FIGS. 19A to 19D, a data path pipeline-connecting the multiplier 62 and the accumulator 64 equipped with the shift function is constituted, whereby the inner product computation of the above equation can be realized by one computation pipeline without division. In this filter processing, in the configuration of the processing unit in the embodiment of the present invention, four two-stage computation pipelines can be realized as shown in FIGS. 19A to 19D.

By adopting such a computation pipeline configuration, the filter processing with respect to all pixels in the image block can be performed by pipeline processing in four parallel system.

Image addition, image subtraction

Also the image addition and image subtraction are basic element processings of the image processing not restricted to image CODEC.

Here, a case of calculating the image addition or image subtraction among the image blocks will be considered.

FIGS. 20A to 20D show the configuration of connection (data path) of the processors where the image addition or image subtraction is realized using the processing unit of one embodiment of the present invention. FIGS. 20A to 20D show the operation modes of four systems of the processing units.

In the configuration of the processing units in the embodiment of the present invention, four one-stage computation pipelines using the EALU 61 can be realized as shown in FIGS. 20A to 20D. By adopting such a computation pipeline configuration, the image addition or image subtraction with respect to all pixels in the image block can be performed by pipeline processing in four parallel systems.

In the above embodiment, a description was made of typical processing of an adaptive video signal, but the adaptive video signal processing apparatus of the present invention is not restricted to the example of the signal processing mentioned above: it can be applied also to other signal processing similar to the above description.

According to the present invention, computation for performing logical computations after performing multiplication, computation for continuously performing multiplication, or various other computations for adding the multiplication results to each other in the element processing of image CODEC can be adaptively realized by one adaptive video signal processing apparatus.

Also, the adaptive video signal processing apparatus of the present invention can be realized by one pipeline processing using one computation pipeline based on the "single instruction stream-multiple data stream (SIMD)" control system.

Accordingly, in comparison with the conventional configuration, the adaptive video signal processing apparatus of the present invention can execute computations using different processors in parallel, and therefore the efficiency of use of the processors is not lowered.

Also, one initialization is sufficient also at the time of the startup of the computation pipeline in the adaptive video signal processing apparatus of the present invention. Further, the adaptive video signal processing apparatus of the present invention does not have to store the intermediate result, and therefore the required data memory capacity is not increased.

Also, the adaptive video signal processing apparatus of the present invention enables realization of a macro-computation pipeline configuration in which three butterfly computers and a multiplication and addition unit are connected by a pipeline memory, and therefore it becomes possible to realize the configuration of the computation pipeline of the butterfly computation and the multiplication and addition in a DCT high speed computation algorithm according to the circuit configuration as proposed in the aforementioned Japanese Patent Application No. 4-338183 (filed on Nov. 25, 1992). By this, in the adaptive video signal processing apparatus of the present invention, the efficiency of use of the processors in the element processing of the DCT/IDCT of the image CODEC is greatly improved in comparison with that of the conventional configuration, and the performance is improved.

APPLICABILITY IN INDUSTRY

The adaptive video signal processing apparatus of the present invention relates to a central processing unit (processing apparatus) in a computer system used for example for calculation of numerical values, image processing, graphic processing, etc. and particularly is used as a digital signal processor suitable for video signal processing such as image compression and encoding (CODEC).

I claim:

1. An adaptive video signal processing apparatus for adaptively performing image compression and encoding/expansion and decoding processing such as discrete cosine transformation/inverse discrete cosine transformation, quantization/inverse quantization, motion vector detection, motion compensation, inner product computation, image data addition, and image data difference processing on blocks of image data of m×n size, said processing apparatus comprising a plurality of processing units provided in parallel, each of which having an extended arithmetic and logic unit performing addition, subtraction, various logical computations, comparison of magnitude, computation of absolute values of differences, butterfly addition and subtraction processing, a first internal pipeline memory provided at a stage after said extended arithmetic and logic unit, a multiplier unit provided at a stage after said first internal pipeline memory, a coefficient memory supplying a coefficient to said multiplier unit, a second internal pipeline memory provided at a stage after said multiplier unit, an accumulation processing unit provided at a stage after said second internal pipeline memory, and a third internal pipeline memory provided at a stage after said accumulation processing unit;

mutually connected pipeline memories disposed so as to connect adjoining processing units among these plurality of parallel processing units; and data selectors which selectively supply the input data to said plurality of processing units, wherein adjoining processing units are coupled via said mutually connected pipeline memories and, the internal pipeline memories in said processing units are selected to constitute a predetermined data flow path, to thereby perform a desired video signal processing such as discrete cosine transformation, wherein said adaptive video signal processor operates by a "single instruction stream·multiple data stream (SIMD)" control system for performing multiple data stream processing by a single instruction stream.

2. An adaptive video signal processing apparatus as set forth in claim 1, wherein in said processing unit, said extended arithmetic and logic unit, said multiplier unit, and said accumulation processing unit perform a pipeline processing operation.

3. An adaptive video signal processing apparatus as set forth in claim 2, wherein each of said extended arithmetic and logic unit has:

a positive/negative inverter which inverts the polarity of a first input data;

a first data selector which is provided at a stage after said positive/negative inverter and selectively outputs said first input data or said polarity-inverted first data;

an adder adding the selected Output data of said first data selector and a second input data;

a subtracter which subtracts said second input data from said first input data;

a logical processor which performs the logical processing of said first input data and said second data such as a logical OR, logical AND, exclusive logical OR, negation, etc.;

a positive/negative decision unit receiving as its input the output of said adder and said subtracter and performing the positive/negative decision;

a second data selector receiving as its inputs the outputs of said adder, said logical processor, and said positive/negative decision unit and selectively outputting a selected input;

a first output terminal connected to said second data selector; and a second output terminal connected to the aforesaid subtracter, any of an addition, subtraction, various types of logical computations, comparisons of magnitude, computation of absolute values of differences, and butterfly addition·subtraction processing being carried out by suitable combining of the components of the extended arithmetic and logic unit from said positive/negative inverter to said second output terminal.

4. An adaptive video signal processing apparatus as set forth in claim 3, wherein a terminal receiving as its input data for discrete cosine transformation processing is provided in the first-stage processing unit of said plurality of processing units; and a terminal receiving as its input the data for inverse discrete cosine transformation processing is provided in the final stage processing unit of said plurality of processing units.

5. An adaptive video signal processing apparatus as set forth in claim 4, wherein a route is established so that, when the discrete cosine transformation processing is carried out by performing a butterfly computation and pipeline memory processing a plurality of times using blocks of image data of m×n size, (a) said discrete cosine transformation processing data is input to said extended arithmetic and logic units in a plurality of processing units excluding said final stage processing unit and the processing results in said extended arithmetic and logic units are output to neighboring mutually connected pipeline memories, and (b) the data of the final stage of the mutually connected pipeline memories is input to the multiplier units in all processing units and the multiplication results are accumulated in said accumulation unit.

6. An adaptive video signal processing apparatus as set forth in claim 4, wherein the route is established so that, when discrete cosine transformation processing is carried out by performing pipeline memory processing and butterfly computation a plurality of times using blocks of image data of m×n size, (a) said discrete cosine transformation processing data is input to the multiplier units in all processing units and the results of multiplication are accumulated at the accumulation unit, (b) the output is input to said extended arithmetic and logic units in the plurality of processing units excluding said initial stage processing unit and the results of processing in said extended arithmetic and logic units are output to mutually connected and neighboring pipeline memories.

7. An adaptive video signal processing apparatus as set forth in claim 1, wherein the route is established so that, when quantization processing is carried out, (a) an output terminal of a multiplier unit of a first processing unit in adjoining processing units is connected to the input terminal of the multiplier unit of the second processing unit, (b) the result of multiplication of said second multiplier unit is input to said accumulation unit at a stage after said second multiplier unit, and (c) the data to be quantized is input to said first multiplier unit.

8. An adaptive video signal processing apparatus as set forth in claim 1, wherein the route is established so that, when inverse quantization processing is carried out, (a) an output terminal of a multiplier unit of a first processing unit in adjoining processing units is connected to the input terminal of the multiplier unit of the second processing unit, (b) the result of multiplication of said second multiplier unit is input to an accumulation unit at a stage after said second multiplier unit, and (c) the data to be inversely quantized and a constant are input to the first processing unit and the result of the computation is input to the first multiplier unit.

9. An adaptive video signal processing apparatus as set forth in claim 1, wherein the route is established so that, when processing for detection of a motion vector is performed, (a) said extended arithmetic and logic units in all processing units are connected to the accumulation processing unit and (b) two sets of data covered by the processing for detection of the motion vector are input to said extended arithmetic and logic units.

10. An adaptive video signal processing apparatus as set forth in claim 1, wherein the route is established so that, when processing is performed for virtual pixel production in motion compensation, (a) said extended arithmetic and logic units in all processing units are connected to said accumulation processing unit and (b) two sets of data covered by the processing for the production of a virtual pixel in motion compensation are input to said extended arithmetic and logic units.

11. An adaptive video signal processing apparatus as set forth in claim 1, wherein the route is established so that, when processing is performed for predictive pixel production in motion compensation, (a) the output of one multiplier unit of adjoining processing units is supplied to one input terminal of the other extended arithmetic and logic unit, (b) the output of the other multiplier unit is supplied to the other input terminal of said other extended arithmetic and logic unit, and (c) the result of computation of said other extended arithmetic and logic unit is accumulated in the other accumulation unit.

12. An adaptive video signal processing apparatus as set forth in claim 1, wherein the route is established so that, when processing is performed for computation of the inner product, (a) the data covered by the processing of the inner product is input to the multiplier units in all processing units and (b) the results of multiplication are accumulated in the corresponding accumulation unit.

13. An adaptive video signal processing apparatus as set forth in claim 1, wherein the route is established so that, when processing is performed for image data addition or image data subtraction, the data to be processed is input to said extended arithmetic and logic units in all processing units and the results of the processing are output.

14. An adaptive video signal processing apparatus for adaptively performing image compression and encoding/expansion and decoding processing such as discrete cosine transformation/inverse discrete cosine transformation, quantization/inverse quantization, motion vector detection, motion compensation, inner product computation, image data addition, and image data difference processing on blocks of image data of m×n size, said processing apparatus comprising a plurality of processing units provided in parallel, each of which having an extended arithmetic and logic unit performing addition, subtraction, various logical computations, comparison of magnitude, computation of absolute values of differences, butterfly addition and subtraction processing, a first internal pipeline memory provided at a stage after said extended arithmetic and logic unit, a multiplier unit provided at a stage after said first internal pipeline memory, a coefficient memory supplying a coefficient to said multiplier unit, a second internal pipeline memory provided at a stage after said multiplier unit, an accumulation processing unit provided at a stage after said second internal pipeline memory, and a third internal pipeline memory provided at a stage after said accumulation processing unit;

mutually connected pipeline memories disposed so as to connect adjoining processing units among these plurality of parallel processing units;

data selectors which selectively supply the input data to said plurality of processing units, wherein adjoining processing units are coupled via said mutually connected pipeline memories and, the internal pipeline memories in said processing units are selected to constitute a predetermined data flow path, to thereby perform a desired video signal processing such as discrete cosine transformation, wherein said adaptive video signal processor operates by a "single instruction stream·multiple data stream (SIMD)" control system for performing multiple data stream processing by a single instruction stream, wherein in said processing unit, said extended arithmetic and logic unit, said multiplier unit, and said accumulation processing unit perform a pipeline processing operation, and wherein each of said extended arithmetic and logic unit has:
- a positive/negative inverter which inverts the polarity of a first input data;
- a first data selector which is provided at a stage after said positive/negative inverter and selectively outputs said first input data or said polarity-inverted first data;
- an adder adding the selected output data of said first data selector and a second input data;
- a subtracter which subtracts said second input data from said first input data;
- a logical processor which performs the logical processing of said first input data and said second data such as a logical OR, logical AND, exclusive logical OR, negation, etc.;
- a positive/negative decision unit receiving as its input the output of said adder and said subtracter and performing the positive/negative decision;
- a second data selector receiving as its inputs the outputs of said adder, said logical processor, and said positive/negative decision unit and selectively outputting a selected input;
- a first output terminal connected to said second data selector; and
- a second output terminal connected to the aforesaid subtracter, any of an addition, subtraction, various types of logical computations, comparisons of magnitude, computation of absolute values of differences, and butterfly addition·subtraction processing being carried out by suitable combining of the components of the extended arithmetic and logic unit from said positive/negative inverter to said second output terminal.

15. An adaptive video signal processing apparatus as set forth in claim 14, wherein
- a terminal receiving as its input data for discrete cosine transformation processing is provided in the first-stage processing unit of said plurality of processing units; and
- a terminal receiving as its input the data for inverse discrete cosine transformation processing is provided in the final stage processing unit of said plurality of processing units.

16. An adaptive video signal processing apparatus as set forth in claim 15, wherein a route is established so that, when the discrete cosine transformation processing is carried out by performing a butterfly computation and pipeline memory processing a plurality of times using blocks of image data of m×n size,
(a) said discrete cosine transformation processing data is input to said extended arithmetic and logic units in a plurality of processing units excluding said final stage processing unit and the processing results in said extended arithmetic and logic units are output to neighboring mutually connected pipeline memories, and
(b) the data of the final stage of the mutually connected pipeline memories is input to the multiplier units in all processing units and the multiplication results are accumulated in said accumulation unit.

17. An adaptive video signal processing apparatus as set forth in claim 15, wherein the route is established so that, when discrete cosine transformation processing is carried out by performing pipeline memory processing and butterfly computation a plurality of times using blocks of image data of m×n size,
(a) said discrete cosine transformation processing data is input to the multiplier units in all processing units and the results of multiplication are accumulated at the accumulation unit,
(b) the output is input to said extended arithmetic and logic units in the plurality of processing units excluding said initial stage processing unit and the results of processing in said extended arithmetic and logic units are output to mutually connected and neighboring pipeline memories.

18. An adaptive video signal processing apparatus as set forth in claim 14, wherein the route is established so that, when quantization processing is carried out,
(a) an output terminal of a multiplier unit of a first processing unit in adjoining processing units is connected to the input terminal of the multiplier unit of the second processing unit,
(b) the result of multiplication of said second multiplier unit is input to said accumulation unit at a stage after said second multiplier unit, and
(c) the data to be quantized is input to said first multiplier unit.

19. An adaptive video signal processing apparatus as set forth in claim 14, wherein the route is established so that, when inverse quantization processing is carried out,
(a) an output terminal of a multiplier unit of a first processing unit in adjoining processing units is connected to the input terminal of the multiplier unit of the second processing unit,
(b) the result of multiplication of said second multiplier unit is input to an accumulation unit at a stage after said second multiplier unit, and
(c) the data to be inversely quantized and a constant are input to the first processing unit and the result of the computation is input to the first multiplier unit.

20. An adaptive video signal processing apparatus as set forth in claim 14, wherein the route is established so that, when processing for detection of a motion vector is performed,
(a) said extended arithmetic and logic units in all processing units are connected to the accumulation processing unit and
(b) two sets of data covered by the processing for detection of the motion vector are input to said extended arithmetic and logic units.

21. An adaptive video signal processing apparatus as set forth in claim 14, wherein the route is established so that, when processing is performed for virtual pixel production in motion compensation,
(a) said extended arithmetic and logic units in all processing units are connected to said accumulation processing unit and
(b) two sets of data covered by the processing for the production of a virtual pixel in motion compensation are input to said extended arithmetic and logic units.

22. An adaptive video signal processing apparatus as set forth in claim 14, wherein the route is established so that, when processing is performed for predictive pixel production in motion compensation, (a) the output of one multiplier unit of adjoining processing units is supplied to one input terminal of the other extended arithmetic and logic unit, (b) the output of the other multiplier unit is supplied to the other input terminal of said other extended arithmetic and logic unit, and (c) the result of computation of said other extended arithmetic and logic unit is accumulated in the other accumulation unit.

23. An adaptive video signal processing apparatus as set forth in claim 14, wherein the route is established so that, when processing is performed for computation of the inner product, (a) the data covered by the processing of the inner product is input to the multiplier units in all processing units and (b) the results of multiplication are accumulated in the corresponding accumulation unit.

24. An adaptive video signal processing apparatus as set forth in claim 14, wherein the route is established so that, when processing is performed for image data addition or image data subtraction, the data to be processed is input to said extended arithmetic and logic units in all processing units and the results of the processing are output.

* * * * *